(12) United States Patent
Kato

(10) Patent No.: US 8,744,219 B2
(45) Date of Patent: Jun. 3, 2014

(54) OPTICAL MODULATOR MODULE AND METHOD FOR MODULATING OPTICAL SIGNAL

(75) Inventor: Tomoaki Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 110 days.

(21) Appl. No.: 13/436,145

(22) Filed: Mar. 30, 2012

(65) Prior Publication Data

US 2012/0251032 A1 Oct. 4, 2012

Related U.S. Application Data

(63) Continuation of application No. PCT/JP2010/006012, filed on Oct. 7, 2010.

(30) Foreign Application Priority Data

Oct. 9, 2009 (JP) ................................ 2009-235014

(51) Int. Cl.
*G02F 1/035* (2006.01)
(52) U.S. Cl.
USPC .............................................................. 385/3
(58) Field of Classification Search
None
See application file for complete search history.

(56) References Cited

U.S. PATENT DOCUMENTS

| | | | |
|---|---|---|---|
| 5,249,243 A | 9/1993 | Skeie | |
| 7,561,806 B2 * | 7/2009 | Bai | ............................. 398/183 |

FOREIGN PATENT DOCUMENTS

| JP | 01-163720 A | 6/1989 |
|---|---|---|
| JP | 01-185613 A | 7/1989 |
| JP | 01-237517 A | 9/1989 |
| JP | 02-168227 A | 6/1990 |
| JP | 02-170142 A | 6/1990 |
| JP | 03-179939 A | 8/1991 |
| JP | 05-257102 A | 10/1993 |
| JP | 05-289033 A | 11/1993 |
| JP | 8-500191 A | 1/1996 |
| JP | 2006-251570 A | 9/2006 |

OTHER PUBLICATIONS

Nobuhiro Kikuchi et al., "Low Driving Voltage 40 Gbit/s Semiconductor-based Mach-Zehnder Modulator", IEICE Technical Report, 2005, OPE2005-95.

Suguru Akiyama et al., "InP-based High-Speed Mach-Zehnder Modulators with Capacitive-loaded Traveling-Wave Electrodes", The 2006 IEICE General Conference, CBS-2-5.

* cited by examiner

*Primary Examiner* — Jerry Rahll
(74) *Attorney, Agent, or Firm* — Sughrue Mion, PLLC

(57) ABSTRACT

The present invention provides a compact, broad-band, and low-drive-voltage optical modulator module capable of generating any multilevel optical modulation. The optical modulator module according to an exemplary aspect of the present invention includes a digital segmented electrode structure optical modulator and m individual driving circuits. The digital segmented electrode structure optical modulator includes semiconductor optical waveguides and at least m waveguide-type optical phase modulator regions. An i-th individual driving circuit includes a driving circuit and a phase shift circuit. The driving circuit amplifies a digital input signal in synchronization with a clock signal and outputs the signal to an i-th waveguide-type optical phase modulator region. The phase shift circuit applies a delay to a signal branched from the clock signal. A j-th individual driving circuit receives an output signal from the phase shift circuit of a (j−1)-th individual driving circuit as a clock signal.

31 Claims, 11 Drawing Sheets

OPTICAL MODULATOR MODULE AND METHOD FOR MODULATING OPTICAL SIGNAL

This is a continuation of International Application PCT/JP2010/006012, with an international filing date of Oct. 7, 2010, which is hereby incorporated by reference herein its entirety.

TECHNICAL FIELD

The present invention relates to an optical modulator module and a method for modulating an optical signal. In particular, the present invention relates to a Mach-Zehnder type optical modulator module and a method for modulating an optical signal in a Mach-Zehnder type optical modulator module.

BACKGROUND ART

With an explosive increase in demand of a broadband multimedia communication service such as the Internet or a high-definition digital TV broadcast, a dense wavelength-division multiplexing optical fiber communication system, which is suitable for a long-distance and large-capacity transmission and is highly reliable, has been introduced in trunk line networks and metropolitan area networks. In access networks, an optical fiber access service spreads rapidly. In such an optical fiber communication system, cost reduction for laying optical fibers as optical transmission lines and improvement of spectral efficiency per optical fiber are important. Therefore, a wavelength-division multiplexing technology which multiplexes multiple optical signals having different wavelengths is widely used.

In an optical transmitter for such a high-capacity wavelength-division multiplexing communication system, an optical modulator is required. In the optical modulator, high speed operation with small wavelength dependence is indispensable. Further, an unwanted optical phase modulation component which degrades the waveform of the received optical signal after long-distance transmission (in the case of using optical intensity modulation as a modulation method), or an optical intensity modulation component (in the case of using optical phase modulation as a modulation method) should be suppressed as small as possible. A Mach-Zehnder (MZ) optical intensity modulator in which waveguide-type optical phase modulators are embedded into an optical waveguide-type MZ interferometer is suitable for such a use. In general, a currently used MZ optical intensity modulator is based on a so-called planar waveguide circuit in which titanium is diffused into the surface of a lithium niobate (LN: $LiNbO_3$) substrate which is a typical electro-optic crystal having a refractive index that changes in proportion to an applied electric field. A typical MZ interferometer has a configuration in which waveguide-type optical phase modulator regions and optical waveguide-type multiplexer/demultiplexer regions are monolithically integrated on the same LN substrate. Further, electrodes for applying the electric field to the waveguide-type optical phase modulator are provided in the waveguide-type optical phase modulator.

To increase the transmission capacity per wavelength channel, a multilevel optical modulation signal system having a smaller optical modulation spectrum bandwidth than a typical binary light intensity modulation system is advantageous in terms of the spectrum use efficiency, wavelength dispersion of an optical fiber, and resistance to polarization mode dispersion, each of which poses a problem. This multilevel optical modulation signal system is considered to become mainstream particularly in optical fiber communication systems in trunk line networks exceeding 40 Gb/s, the demand for which is expected to increase in the future. For such use, a monolithically integrated multilevel optical modulator in which two MZ optical intensity modulators described above and an optical multiplexer/demultiplexer are used in combination has recently been developed. The LN-based MZ optical intensity modulator modules, which are currently commercially available, have some problems with the size (electrode length: about 5 cm, module length: about 15 cm), the driving voltage (about 5 $V_{p-p}$), and the like. However, since there is no practical optical modulator which surpasses the LN-based MZ optical intensity modulator in high-speed long distance optical transmission properties, it is still widely used for an optical transmitter unit or the like in various optical communication systems in trunk line networks.

In high speed optical modulation by using this optical modulator, especially in the high-frequency region in which the frequency of the modulation electric signal is over 1 GHz, the propagating wavelength of the modulation electric signal becomes equal to or shorter than the length of the electrode serving as means for applying an electric field to the optical phase modulator region in the LN-based optical modulator. Therefore, voltage distribution of the electrode is no longer regarded as uniform in an optical signal propagation axis direction. To estimate optical modulation characteristic exactly, it is required to treat the electrode as a distributed constant line and treat the modulation electric signal propagating through the electrode as a traveling-wave, respectively. In that case, in order to increase the effective interaction length with the modulated optical signal and the modulation electric signal which are propagating in the optical phase modulator region, a so-called traveling-wave type electrode which is devised to make a phase velocity $v_o$ of the modulated optical signal and a phase velocity $v_m$ of the modulation electric signal as close to each other as possible (phase velocity matching) is required.

In order to realize optical waveguide-type semiconductor optical phase modulators and semiconductor MZ optical modulators, a III-V compound semiconductor such as gallium arsenide (GaAs) or indium phosphide (InP), which is useful for forming a light source element, can be used so as to apply materials having a (complex) refractive index with respect to optical signal, which changes as applied electric field changes, to an undoped core layer. In this case, a single-mode optical waveguide with a so-called p-i-n diode structure in which an undoped core layer is sandwiched between a p-type cladding layer and an n-type cladding layer is widely used so as to apply the electric field to the core layer by applying reverse bias voltage.

For example, assume the case where an electrode stripe is provided in a single-mode optical waveguide with a practical p-i-n type diode structure in 1550 nm band mainly used in the optical fiber communication system. In the case of utilizing the optical waveguide as the transmission line of the modulation electric signal, the p-type semiconductor which usually has lower electrical conductivity than the n-type semiconductor has to be used as a cladding layer. Accordingly, the (complex) characteristic impedance (absolute value) of the transmission line, which affects the modulation electric signal, is decreased to about 20Ω, which is less than half of the typical characteristic impedance (50Ω) of microwave circuit components. As a result, this impedance mismatch leads to degradation of the modulation bandwidth due to reflection or the like and increase in driving voltage when the modulation electric signal output from the driving circuit is applied to the optical modulator as a transmission line. For the same reason, the effective refractive index $n_m$ ($=c_0/|v_m|$, $c_0$: velocity of light in free space) which affects the modulation electric signal is about seven on average. This value is about twice the effective refractive index $n_o$ ($=c_0/|v_o|$, about 3.5 in InP) of the modulated optical signal.

This velocity mismatch between the modulated optical signal and the modulation electric signal limits the effective interaction length therebetween. This leads to degradation of the modulation bandwidth and increase in driving current, as in the case of an impedance mismatch. Thus, in the case of employing the traveling-wave type electrode is employed in the waveguide-type optical phase modulator or the electro absorption type optical intensity modulator, to which the p-i-n type diode structure is applied, there are problems in reduction in operation voltage and increase in bandwidth.

In regard to such problems, it is reported that the phase velocity matching and the impedance matching are attempted to be satisfied by changing the layered structure or the electrode structure of the semiconductor optical modulator. For example, it is reported that the phase velocity matching and the impedance matching are attempted to be satisfied while maintaining a uniform layered structure along the optical signal propagation axis, by employing a layered structure with no p-type semiconductor layer such as an n-SI-i-n type (SI: semi-insulating semiconductor) (Non-Patent Literature 1).

For example, there is proposed a configuration in which a low-impedance region (region in which the phase velocity of the modulation electric signal is low and the characteristic impedance is low) with a p-i-n layered structure and a high-impedance region (region in which the phase velocity of the modulation electric signal is high and the characteristic impedance is high) with an SI-i-n layered structure, for example, are alternately arranged at a sufficiently shorter pitch than that of the propagating wavelength, of the modulation electric signal (Non-Patent Literature 2). According to this configuration, the phase velocity and the characteristic impedance in the both regions are averaged by weighting, thereby satisfying the apparent phase velocity matching and impedance matching.

There is also proposed an optical modulator having a segmented electrode structure in which the electrode of the optical modulator is segmented (Patent Literatures 1 to 3). Additionally, there is proposed a configuration in which the length of each of segmented electrodes arranged in a modulator is a power-of-two multiple of a certain unit length (Patent Literatures 4 to 7).

CITATION LIST

Patent Literature

[Patent Literature 1] Japanese Unexamined Patent Application Publication No. 05-257102
[Patent Literature 2] Japanese Unexamined Patent Application Publication No. 01-237517
[Patent Literature 3] Japanese Unexamined Patent Application Publication No. 02-170142
[Patent Literature 4] Japanese Unexamined Patent Application Publication No. 01-185613
[Patent Literature 5] Japanese Unexamined Patent Application Publication No. 02-168227
[Patent Literature 6] Japanese Unexamined Patent Application Publication. No. 03-179939
[Patent Literature 7] Japanese Unexamined Patent Application Publication No. 05-289033

Non Patent Literature

[Non-Patent Literature 1] Ken Tsuzuki and six other persons, "Low Driving Voltage 40 Gbit/s Semiconductor-based Mach-Zehnder Modulator", TEICE Technical Report, 2005, OPE2005-95
[Non-Patent Literature 2] Suguru Akiyama and one other person, "InP-based High-Speed Mach-Zehnder Modulators with Capacitive-loaded Traveling-Wave Electrodes", The 2006 TRICE General Conference, CBS-2-5

SUMMARY OF INVENTION

Technical Problem

In general, the envelope of the amplitude of the modulation electric signal propagating along the optical signal propagation axis of a traveling-wave type optical modulator decreases in an exponential fashion as shown in FIG. 11. Accordingly, the contribution to the optical modulation operation is inevitably decreased toward the region at the back end of the raveling-wave type optical modulator. Although it is possible to infinitely increase the optical modulator length by satisfying the phase velocity matching and the impedance matching described above, if the length exceeds a certain length, the redundant portion does not substantially contribute to the optical modulation operation. Thus, the effective optical modulation degree of the traveling-wave type optical modulator is saturated at a certain value. Assuming that the attenuation constant of the amplitude of the modulation electric signal propagating along the longitudinal axis of the traveling-wave type electrode is $\alpha_m$, an effective optical modulator length $L_{eff}$ at which the optical modulation degree is saturated is given by a reciprocal ($1/\alpha_m$). FIG. 12 is a graph showing the relation between the attenuation constant of the modulation electrical signal propagating through the traveling-wave type electrode and the effective optical modulator length $L_{eff}$.

The problem is the magnitude of the attenuation constant $\alpha_m$. A conductor loss of conductive materials used for the traveling-wave type electrode generally increases in proportion to the one-half power of the frequency. A dielectric loss of the optical waveguide also increases along with the frequency, so that the attenuation constant of the traveling wave electrode increases with an increase in the modulation frequency. Accordingly, the amplitudes of higher frequency components contained in the modulation electric signal decrease at the back end of the traveling-wave type electrode. As a result, a distortion occurs in the modulation electric signal, and such a distortion affects the optical modulation waveform. This raises a concern that the light transmission waveform deteriorates after propagating over a long distance through an optical fiber. In the case of reducing the length of the optical modulator so as to suppress the effect of attenuation of the modulation electric signal in the traveling-wave type electrode, an increase in the amplitude of the modulation electric signal necessary for driving is inevitable. An IC process capable of satisfying both a relatively high (about 2 to 8V) voltage amplitude and a high-speed operation of several tens Gb/s is currently limited to the use of a compound semiconductor such as GaAs or InP. Even if a driving circuit based on a compound semiconductor is used, deterioration in reliability due to an increase in the voltage amplitude is still a concern. Currently, 40 Gb/s-class optical fiber communication systems are commercially available. However, in such a high-frequency region covering the millimeter waveband, the ratio of the conductor loss or the dielectric loss to the attenuation constant is a predominant factor. Therefore, it is considered that deterioration in characteristics of the traveling-wave type modulator due to the attenuation of the modulation electric signal becomes a serious problem in the future.

Thus, the traveling-wave type electrode is devised to achieve a broader bandwidth of the waveguide-type optical modulator and reduction in the driving voltage. However, the effect is inevitably limited by the attenuation of the modulation electric signal as described above. This limitation is also present in the techniques proposed in Non-Patent Literatures 1 and 2 in which no countermeasure against the attenuation of the modulation electric signal is taken. In other words, it is suggested that the broader bandwidth of the waveguide-type optical modulator and the reduction in the driving voltage can be achieved if it is possible to suppress the attenuation of the modulation electric signal or devise the electrode or the driving circuit to produce an effect equivalent to the effective suppression of the attenuation.

In an orthogonal frequency division multiplex (hereinafter referred to as "OFDM") modulation system and a quadrature amplitude modulation (hereinafter referred to as "QAM") system, in which a high spectral efficiency is expected, among the multilevel optical modulation systems described above, a combination of an amplitude and a phase (or a real part and an imaginary part) of an optical signal are correlated with multiple bits of modulation data, and an optical modulation signal becomes a complex optical modulation signal. That is, increasing the spectral efficiency of an optical modulation code indicates setting the level of each of the amplitude and the phase of the optical signal to multilevel values. This means that it is necessary to arbitrarily set the amplitude of the modulation electric signal to generate the complex optical modulation signal using the multilevel optical modulator described above. As means for generating an analog electric signal of an arbitrary amplitude in a pseudo manner, a digital-to-analog converter (hereinafter referred to as "DAC") having a number of bits corresponding to the set resolution is generally used. However, only a conversion rate of about several GHz is obtained in the search and development stages, though the conversion rate depends on the internal circuit configuration and the like. The resolution (the number of bits) tends to be lower (decrease) in the high-speed DAC. At present, the resolution of the DAC that can achieve a settling time of about several 100 psec is 4 to 6 bits (16 to 64 stages) at most. In addition, 1 V or more of a maximum voltage (or maximum current) amplitude to be output can hardly be expected to be adaptable for a response speed of several GHz.

On the other hand, the optical fiber communication system in trunk line networks, which seeks to increase the transmission capacity by introducing the multilevel optical modulation system, is mainly targeted for a data transmission rate of more than 40 Gb/s per wavelength channel. It is extremely difficult to achieve such a high-speed DAC to drive the multilevel optical modulator in conformity with the transmission rate. Further, it is necessary to provide a driving circuit for linearly amplifying the analog electric signal output from the DAC with as small a distortion as possible to obtain a sufficient voltage amplitude (generally, about 3.3 to 7 V) for driving the multilevel optical modulator. However, it is not easy to faithfully amplify the analog electric signal linearly, which similarly varies at such a high rate of several 10 GHz, even if the characteristics of the amplification element itself are improved and the circuit is devised.

In the examples disclosed in Patent Literatures 1 to 3, a signal for driving each of the segmented electrodes is generated using a single output electric signal of one driving circuit and N branch elements. It is generally difficult to evenly divide the power of the branch elements while evenly maintaining the frequency response characteristics, and there is such a drawback that a variation in branch power between output terminals is also superimposed. Further, since an excessive loss occurs in addition to a reduction in power due to the N segmentation, it is necessary to drastically increase the output voltage amplitude of the driving circuit to compensate for the reduction in power, instead of lowering the output amplitude. This is disadvantageous in terms of design and reliability of the driving circuit. Though it is possible to match pseudo phases depending on the propagation of optical signal for each of the segmented electrodes, it is difficult to generate the multilevel optical modulation code, because the same modulation electric signal is merely input to each electrode.

In the examples disclosed in the Patent Literatures 4 and 5, four-phase optical phase modulation light can be statically generated. However, the phase difference relation between modulation electric signals to be applied to the segmented electrodes depending on the propagation of the modulated optical signal is unclear, and thus high-speed operation is suspected. Patent Literatures 6 and 7 disclose compensation of the phases of modulation electric signals for driving each segmented optical modulator region. However, it is unclear whether dynamic arithmetic processing can be performed on a time-series data input signal according to certain parameters and modulation electric signals having an appropriate voltage amplitude can be applied to each segmented optical phase modulator region.

In view of the above, the examples disclosed in Patent Literature 1 to 7 have problems to be solved in implementing the multilevel optical modulator capable of dynamically reconfiguring the optical modulation characteristics depending on the conditions at an ultra high speed and at a low driving voltage. The multilevel optical modulator is an essential component of a next-generation large-capacity optical fiber communication system at over 100 Gb/s. Therefore, these examples are not practical.

For such reasons, the multilevel optical modulation module applicable to the next-generation optical fiber communication system and capable of high-speed multilevel optical modulation has not been developed yet.

The present invention has been made in view of the above-mentioned problems, and therefore an object of the present invention is to provide a compact, broadband, and low-drive-voltage optical modulator module capable of generating any multilevel optical modulation signal while maintaining phase velocity matching and impedance matching required for traveling-wave operation by inputting a digital signal.

Solution to Problem

An optical modulator module according to an exemplary aspect of the present invention includes: an optical modulator that modulates an input optical signal; and m ($2 \leq m$, m is an integer) individual driving circuits connected in cascade. The optical modulator includes: an optical waveguide that guides the optical signal; and at least m waveguide-type optical phase modulator regions arranged on the optical waveguide. An i ($1 \leq i \leq m$, i is an integer)-th individual driving circuit includes: a driving circuit that outputs a signal obtained by amplifying a digital input signal in synchronization with a clock signal to an i-th waveguide-type optical phase modulator region; and a phase shift circuit that applies a delay to at least a signal branched from the clock signal and outputs the signal. A j ($2 \leq j \leq m$, j is an integer)-th individual driving circuit receives a signal output from the phase shift circuit of a (j−1)-th individual driving circuit as the clock signal.

A method for modulating optical signal according to another exemplary aspect of the present invention includes: generating, by an i (1≤i≤m, i is an integer)-th individual driving circuit among m (2≤m, m is an integer) individual driving circuits connected in cascade, a signal obtained by amplifying a digital input signal in synchronization with a clock signal; outputting, by a driving circuit, the amplified signal to an i-th waveguide-type optical phase modulator region among m waveguide-type optical phase modulator regions formed on an optical waveguide of an optical modulator; outputting, by a phase shift circuit, a signal obtained by applying a delay to at least a signal branched from the clock signal; and inputting, to a j (2≤j≤m, j is an integer)-th individual driving circuit, a signal output from the phase shift circuit of a (j−1)-th individual driving circuit as the clock signal.

Advantageous Effects of Invention

According to exemplary aspects of the present invention, it is possible to provide a compact, broad-band, and low-drive-voltage optical modulator module capable of generating any multilevel optical modulation signal simply by inputting a digital signal.

DESCRIPTION OF EMBODIMENTS

First Exemplary Embodiment

Hereinafter, exemplary embodiments of the present invention will be described with reference to the drawings.

Figure 1:
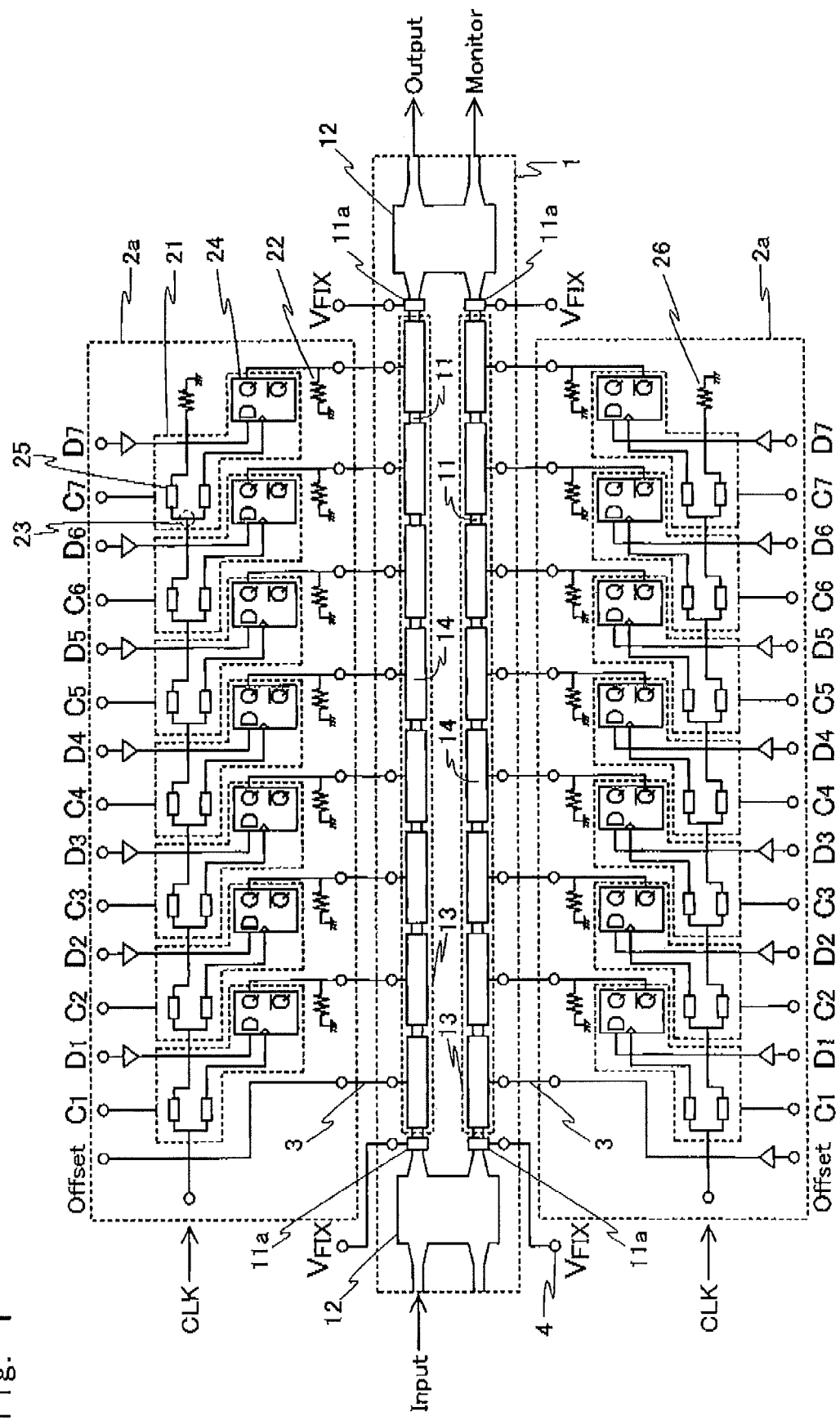
FIG. 1 is a block diagram of a digital segmented electrode structure multilevel optical modulator module according to a first exemplary embodiment.

FIG. 1 is a block diagram of a digital segmented electrode structure multilevel optical modulator module 100, which is an exemplary digital segmented electrode structure multilevel optical modulator module, according to a first exemplary embodiment. The configuration of the digital segmented electrode structure multilevel optical modulator module 100 will be described below. As shown in FIG. 1, the digital segmented electrode structure multilevel optical modulator module 100 includes a digital segmented electrode structure optical modulator 1 and two integrated circuits 2a.

The digital segmented electrode structure optical modulator 1 has an MZ interferometer structure including two single-mode semiconductor optical waveguides 11 and a two-input/two-output optical multiplexer/demultiplexer 12. As shown in FIG. 1, optical signal Input is launched from the left side, and an output signal Output and a monitor output Monitor are output from the right side. The two semiconductor optical waveguides 11 serving as a pair of delay paths in the MZ interferometer are respectively provided with digital segmented electrode structure optical phase modulators 13.

Each of the semiconductor optical waveguides 11 includes a core layer which is sandwiched by cladding layers. In each of the semiconductor optical waveguides 11, an electric field can be applied to the core layer (not shown), or an electric current can be injected into the core layer, thereby enabling change of its refractive index which affects the optical signal propagating along the core layer. In each of the semiconductor optical waveguides 11, a laterally tapered spot size converter (not shown) is provided in the vicinity of both cleaved end faces of the digital segmented electrode structure optical modulator 1, and low reflection films (not shown) are formed at the both cleaved facets.

The digital segmented electrode structure optical phase modulator 13 is segmented into n (n>2, n is an integer) waveguide-type optical phase modulator regions 14 to define small segments of the semiconductor optical waveguides 11. For example, the digital segmented electrode structure optical phase modulator 13 can be segmented into a power-of-two number, i.e., $n=2^h$ (h>2; h is an integer), of waveguide-type optical phase modulator regions 14. FIG. 1 shows an example assuming h=3. The adjacent waveguide-type optical phase modulator regions 14 are electrically isolated from each other by ion implantation of an element, such as helium or titanium, which inhibits electrical conductivity of the semiconductor (optical waveguides 11).

Each of the integrated circuits 2a includes m (m≤n, m is an integer) individual driving circuits 21 and m terminators 22. FIG. 1 shows an example assuming $m=(2^h-1)$. Each of the individual driving circuits 21 is a circuit block including a branch 23, a driving circuit 24, and a phase shift circuit 25. The branch 23 has one input and two outputs and divides an input clock signal CLK into two signals.

The driving circuit 24 outputs discriminated digital input signals $D_1$ to $D_7$ to the respective waveguide-type optical phase modulator regions 14 in synchronization with one of the divided clock signals CLK. The output stage of the driving circuit 24 has functions of delaying, amplitude adjustment, bias adjustment, and waveform shaping. These functions can be controlled by external electric signals (signals $C_1$ to $C_7$ shown in FIG. 1). As shown in FIG. 1, for example, these functions of the driving circuit 24 can be implemented by applying D-type flip-flop circuits (D-FF circuits).

The phase shift circuit 25 outputs the other of the divided clock signals CLK to the subsequent-stage individual driving circuit 21. The phase shift circuit 25 also has functions of delaying, amplitude adjustment, and waveform shaping. These functions can be controlled by external electric signals in the same manner as the driving circuit 24.

The first waveguide-type optical phase modulator region 14 counted from the input side receives an offset signal Offset for adjusting an offset in the phase of the modulated optical signal. The signal output of the i-th ($2 \leq i \leq m = 2^h - 1$, i is a natural number) individual driving circuit 21 counted from the input side and the (1+1) waveguide-type optical phase modulator region 14 are connected by a driving signal line 3.

A terminator 26 that terminates the clock signal transmitted through each of the individual driving circuits 21 is connected between the last-stage individual driving circuit 21 counted from the input side and a ground potential.

A terminator 22 is connected between the corresponding driving signal line 3 and a common ground (not shown) to suppress a waveform distortion or degradation in bandwidth due to reflection of the signal output Note that the impedance of the terminator 22 is matched with the output impedance of the connected individual driving circuit 21.

Semiconductor optical waveguides 11a which smoothly connect the optical multiplexer/demultiplexer 12 with the waveguide-type optical phase modulator regions 14 adjacent to the optical multiplexer/demultiplexer 12 are connected to potential clamp means 4 of a potential $V_{FIX}$. This allows the optical multiplexer/demultiplexer 12 and the semiconductor optical waveguides 11a to be connected to an external constant voltage source and kept at a constant potential regardless of the magnitude of the driving signal. This is because such a phenomenon can be prevented in which the optical multiplexer/demultiplexer 12 and the semiconductor optical waveguides 11a contribute to optical modulation due to leakage of the modulating signal to the optical multiplexer/demultiplexer 12 and the semiconductor optical waveguide 11a, resulting in an increase in modulation frequency response especially in a low-frequency region.

Next, the operation of the digital segmented electrode structure multilevel optical modulator module 100 will be described. The clock signal CLK input to the digital segmented electrode structure multilevel optical modulator module 100 is first divided into two signals at the branch 23. One of the divided clock signals CLK is guided to the clock signal input of each of the individual driving circuits 21. The individual driving circuits 21 performs a logic discrimination operation on the digital input signals $D_1$ to $D_7$ in synchronization with one of the divided clock signals CLK, and drives the waveguide-type optical phase modulator regions 14 depending on the result of the operation.

The other of the divided clock signals CLK is guided to the subsequent-stage individual circuit 21 through the phase shift circuit 25. By repeating this process, the (2h−1) individual driving circuits 21 can sequentially drive the respectively connected waveguide-type optical phase modulator regions 14.

The delay of the phase shift circuit 25 is adjusted such that the time required for the clock signal CLK to pass through one stage of the phase shift circuits 25 is equal to the time required for the modulated optical signal input to the digital segmented electrode structure multilevel optical modulator module 100 to pass through one stage of the waveguide-type optical phase modulator regions 14. Alternatively, the delay of the driving circuit 24 is adjusted such that each of the driving signal lines 3 has a constant delay time. For example, the delay of the phase shift circuit 25 in the i-th individual driving circuit 21 is achieved by being set to be substantially equal to the difference in time required for optical signal to travel a distance between middle points of the (i−1)th waveguide-type optical phase modulator region 14 and the i-th waveguide-type optical phase modulator region 14. As a result, a pseudo traveling wave operation is realized in the digital segmented electrode structure multilevel optical modulator module 100. Therefore, one of the inconsistent constraints in terms of the layered structure design of the waveguide-type optical modulator, that is, the phase velocity matching and the impedance matching, can be eliminated. This enhances degree of freedom of design in designing the waveguide from the viewpoints of optical characteristics rather than those from the phase velocity/impedance matching.

In this configuration, the individual driving circuits 21 are respectively provided for the waveguide-type optical phase modulator regions 14. This results in overcoming a problem that the amplitude of the modulation electric signal decreases toward the back end of the optical phase modulator region, which is a concern in the existing optical modulator, particularly when the modulation frequency is high. Accordingly, a number of stages of optical modulator regions can be connected in cascade within the allowable range of the attenuation of the modulated optical signal in the system configuration. This leads to an increase in the length of the optical modulator beyond the limitation of the effective optical modulator length $1/\alpha_m$ of the traveling-wave type modulator.

Furthermore, the optical modulation degree per stage of the segmented optical modulator regions can be suppressed to a small degree, resulting in lowering the driving voltage. This eliminates the need for a driving circuit having a large amplitude which is hardly compatible with the broadband and which poses many problems in terms of the reliability. This leads to suppression of the output current of each transistor used at the output stage of each of the individual driving circuits to a relatively small amount, which is advantageous in terms of improvement in operation speed, suppression of distortion of a driving signal waveform, and improvement in reliability.

Thus, when the segmented waveguide-type optical phase modulator regions 14 have a small capacitance and are each regarded as a lumped-constant circuit element (lumped-constant type optical modulator) and when the lines connecting the individual driving circuits 21 and the waveguide-type optical phase modulator regions 14 are sufficiently shorter than a propagating wavelength at a frequency of a modulation electric signal, the degree of freedom of each of the value of the termination resistor and the formation position thereof can be increased. As for the resistance value, for example, if the required frequency band is 50 GHz and the frequency band estimated from a CR product at a termination of 50Ω can be set to 100 GHz, which is a value twice as large as the required value, when the resistance value of the terminator is doubled, i.e., 100Ω, the output voltage amplitude can be doubled assuming that the output current from the output-stage transistor of each driving circuit is the same. Additionally, the drive current can be suppressed to ½ while maintaining the same driving voltage. In the former case, a reduction in the operation current density of the output-stage transistors leads to a high reliability. In the latter case, miniaturization of the output-stage transistors leads to a high-speed operation due to a reduction in element capacitance, and the margin of the operation speed can also be applied to one of these. Furthermore, a Joule loss (that is, heat generation) in the terminator is in proportion to a square of a drive current and a resistance. Accordingly, when the drive current is reduced by half, the calorific value can be suppressed to ½. Obviously, this is favorable in terms of reliability for the elements forming the driving circuit. Moreover, a mode can be implemented in which a terminator is directly formed on a driving IC or an optical modulator (a so-called on-chip terminal), which is advantageous in terms of high-frequency characteristics but cannot be conventionally adopted because of a concern about temperature characteristics. This is advantageous in terms of improvement in high-frequency characteristics. On the other hand, the terminator can be effectively treated as lumped element. Accordingly, even when the terminator is disposed on the individual driving circuit or the optical modulator or in the middle of these circuits, the effect of this position on the frequency response characteristic can be suppressed to a level low enough to be practically negligible. As a result, the degree of freedom of the module implementation form can be increased in terms of circuit configuration.

Whether or not to perform optical phase modulation in the i-th waveguide-type optical phase modulator region 14 counted from the input side, for example, is designated by a digital input signal $D_i$ which is input to the i-th individual driving circuit 21 connected to the i-th waveguide-type optical phase modulator region 14. In this case, assuming that the waveguide-type optical phase modulator regions 14 have the same length and the amount of phase shift received by the modulated optical signal in each of the waveguide-type optical phase modulator region 14 is the same, the total amount of phase shift received by the modulated optical signal is in proportion to the number of the waveguide-type optical phase modulator regions 14 designated to perform optical phase modulation by the digital input signal $D_i$.

When $2^{(k-1)}$ individual driving circuits 21 are driven in groups using the same logic by a k ($1 \le k \le n$, k is an integer)-th digital input signal $D_k$, the total phase shift amount of the modulated optical signal can be discretely designated by (n−1) digital input signals. This enables implementation of a function equivalent to the replacement of an analog electric signal output with an optical phase in a digital-to-analog converter.

As in the digital segmented electrode structure multilevel optical modulator module 100, $2^{2n}$ combinations of complex amplitudes of modulated optical signals can be designated in the configuration in which the digital segmented electrode structure optical phase modulators 13 described above are formed in each pair of delay paths of the MZ interferometer. According to this configuration, multilevel optical modulation using a digital signal can be achieved without directly applying an analog electric signal. For example, an offset in the phase shift amount can be adjusted by applying a separate voltage signal to the electrodes of the waveguide-type optical phase modulator regions 14, which need not be driven, as in the first waveguide-type optical phase modulator region 14 counted from the input side of FIG. 1.

When each of the segmented electrodes (optical modulator regions) can be regarded as a lumped element (lumped type optical modulator), a measure of the modulation frequency band thereof is generally given by the product (CR product) of the capacitance of the optical modulator region and the resistance of the terminator. According to an exemplary aspect of the present invention, this capacitance decreases substantially in inverse proportion to the number of the segmented regions. Therefore, a modulation frequency band of more than 100 GHz seems to be relatively easily achieved in each of the segmented optical modulator regions, which is advantageous in terms of high-speed operation.

Furthermore, as described above, a reduction in driving voltage amplitude can be achieved, thereby enabling production of a driving circuit using a semiconductor process technology, which has a low voltage amplitude but is excellent in mass production, high uniformity, and high integration of CMOS-IC (Complementary Metal Oxide Semiconductor-Integrated Circuit), SiGe-HBT (Heterojunction Bipolar Transistor)-IC, and the like. Therefore, the present invention is advantageous in terms of smaller size, lower cost, lower power consumption, and the like, as compared to the case of using the existing driving circuit which is based on a III-V compound semiconductor such as GaAs or InP and which has a higher driving voltage and is inferior in mass production and high integration while achieving a high-speed operation. Moreover, light source elements can be highly integrated to reduce the number of components, which leads to a further reduction in cost.

Additionally, a reduction in driving voltage amplitude according to this configuration enables operation in a (more linear) region with a relatively small variation in non-linear (complex) refractive index with respect to an applied electric field as indicated by phenomena such as Franz-Keldysh effect and quantum confined Stark effect which are basic modulation principles for semiconductor optical modulators. Accordingly, characteristics comparable to those of the LN-based optical modulator can be achieved even in the case of using a semiconductor optical modulator element based on a compound semiconductor which is regarded as being disadvantageous in terms of larger frequency chirping than that of the LN-based optical modulator and optical fiber transmission characteristics.

In other words, this configuration is provided with means for separately driving segmented optical phase modulator regions. This enables effective suppression of a phenomenon in which a modulation electric signal propagating along a typical traveling wave electrode is attenuated in the traveling-wave electrode. Therefore, this configuration can solve the problem of the saturation of optical modulation efficiency during high-speed optical modulation, which is inherent in traveling-wave type optical modulators.

Furthermore, this configuration enables each parasitic capacitance to be reduced to about 1/n by segmenting the waveguide-type optical phase modulator region into n regions. This drastically improves the modulation bandwidth per stage of the waveguide-type optical phase modulator regions, which is advantageous for high-speed optical modulation. In this configuration, the problem of a loss in the modulation electric signal in each of the segmented waveguide-type optical phase modulator regions is practically negligible. For this reason, the overall length of the phase modulator regions contributing to the optical (phase) modulation as described above can be increased (beyond the limitation of $1/\alpha_m$). Accordingly, in inverse proportion to this, the driving voltage required to obtain the amount of phase shift per stage that is received by each waveguide-type optical phase modulator region can be reduced, which is advantageous for low-voltage driving.

The segmented electrode structure optical phase modulator can achieve the function of applying a certain discrete phase shift to optical signal passing therethrough by digital control, but cannot control the absolute value of the optical signal amplitude directly. In this case, the use of a segmented electrode structure MZ multilevel optical modulator in which segmented electrode structure optical phase modulators are respectively incorporated in a pair of delay paths of an MZ interferometer enables generation of any complex light amplitude within a circle having a radius of "1" on a complex plane. When an I-Q optical modulator is configured to perform I-Q quadrature modulation (I: In-Phase, Q: Quadrature-Phase), which is widely used in radio communications and the like, on light, a pair of segmented electrode structure MZ multilevel optical modulators may be prepared and a modulated optical signal output from a light source may be branched into two signals to be subjected to optical modulation using I-channel and Q-channel modulation electric signals. Each modulated optical signal may be multiplexed with a phase difference of π/4.

Figure 2:
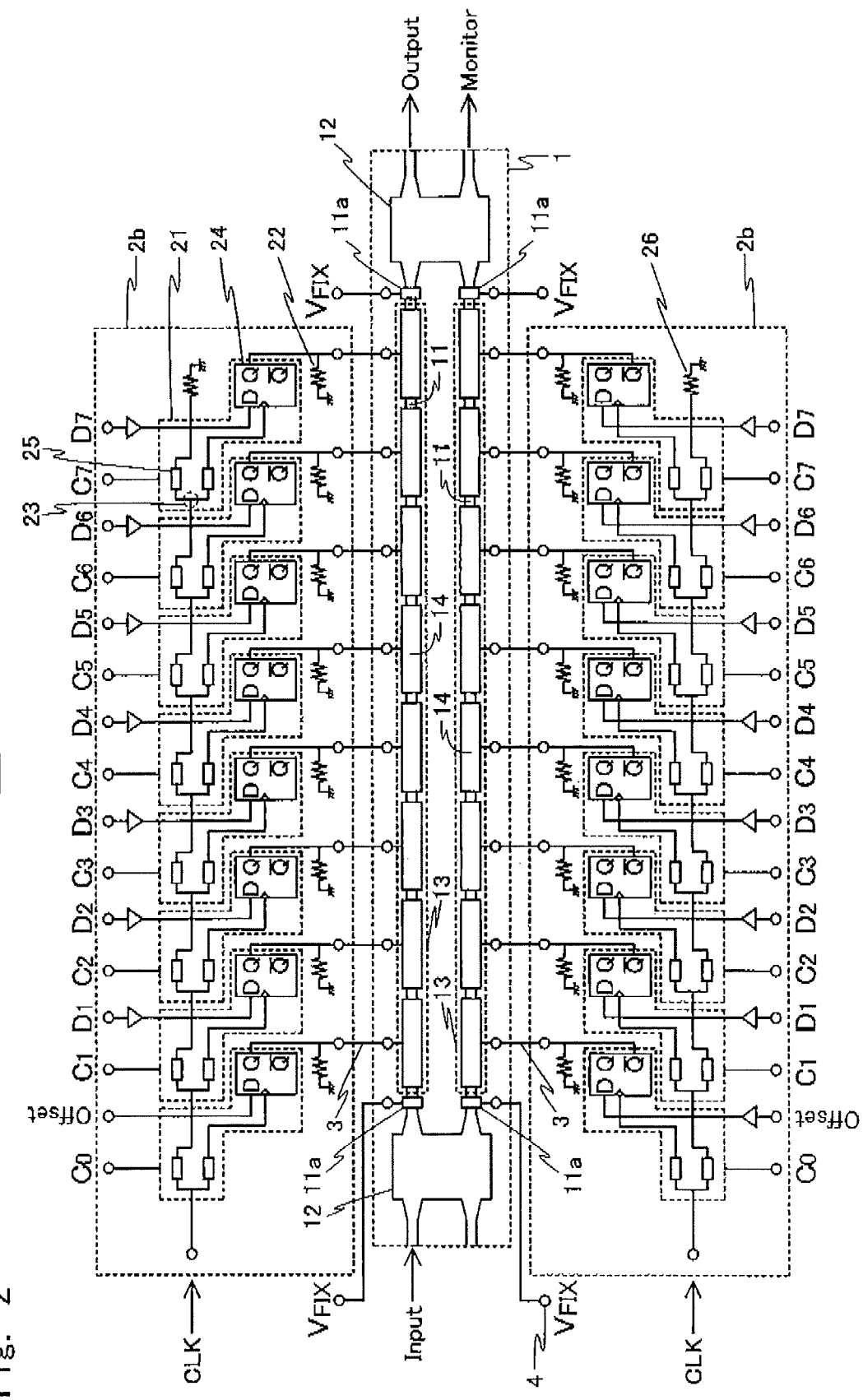
FIG. 2 is a block diagram of a modified example of the digital segmented electrode structure multilevel optical modulator module according to the first exemplary embodiment.

FIG. 2 is a block diagram of a digital segmented electrode structure multilevel optical modulator module 101 which is a transformed example of the configuration of the digital segmented electrode structure multilevel optical modulator module 100. The digital segmented electrode structure multilevel optical modulator module 101 has a configuration in which the integrated circuit 2a of the digital segmented electrode structure multilevel optical modulator module 100 is replaced with an integrated circuit 2b. In the integrated circuit 2b, the individual driving circuit 21 is also connected to the first waveguide-type optical phase modulator region 14 counted from the input side. Also in this digital segmented electrode structure multilevel optical modulator module 101, an offset in the phase of the modulated optical signal can be adjusted by appropriately operating the first individual driving circuit 21 counted from the input side, as in the digital segmented electrode structure multilevel optical modulator module 100.

First Example

A first example is an example of operation verification of the digital segmented electrode structure multilevel optical modulator module 100 according to the first exemplary embodiment.

In this example, the semiconductor optical waveguides 11 of the digital segmented electrode structure optical modulator 1 are formed on an Fe-doped-InP semi-insulating substrate (not shown). A core layer and cladding layers sandwiching the core layer are formed on the Fe-doped InP semi-insulating substrate. The core layer is formed of an undoped AlGaInAs multi-quantum well layer (the number of well layers: 12; well layer thickness: 10 nm; barrier layer thickness: 8 nm; transition wavelength: 1400 nm) and undoped InGaAsP light confining layers (wavelength composition: 1300 nm; thickness: 20 nm) formed on and under the undoped AlGaInAs multi-quantum well layer, and has a so-called separate confinement heterostructure (each of which is not shown). The cladding layers are made of p-type and n-type InP. The semiconductor optical waveguides 11 have such properties that the (complex) refractive index which affects optical signal of a 1550 nm band propagating therethrough is changed due to the quantum confined Stark effect, when an electric field is applied to the undoped AlGaInAs multi-quantum well layer. The optical multiplexer/demultiplexer 12 is a two-input/two-output MMI (Multi Mode Interference) multiplexer/demultiplexer having a layered structure similar to that of the semiconductor optical waveguides 11.

The plurality of individual driving circuits 21 are monolithically integrated on the same semiconductor substrate using an SiGe-HBT process, and are configured to be operable in accordance with the clock signal CLK of more than 50 Gb/s. The driving signal lines 3 are each formed of a strip line, and have a characteristic impedance of 50Ω. The resistance value of each terminator 22 is 50Ω.

In each of the waveguide-type optical phase modulator regions 14, the series resistance was 5Ω and the element capacitance was 0.07 pF or less. The frequency response band of a single waveguide-type optical phase modulator region was 55 GHz. Note that the waveguide-type optical phase modulator regions 14 which need not be driven were used to adjust the offset in the phase shift amount by applying a separate voltage signal to the electrodes thereof. Each of the waveguide-type optical phase modulator regions 14 was driven by an electric signal having an amplitude of 0.7 Vpp, so that a phase variation of π/16 was able to be applied to a modulated optical signal with a wavelength of 1550 mil which was incident in a TE (Transverse Electric) basic mode.

Further, the delay of the phase shift circuit 25 was adjusted to match the time required for the modulated optical signal to pass through one stage of the waveguide-type optical phase modulator regions 14 with the time required for, the clock signal to pass through one stage of the individual driving circuits 21. Thus, a pseudo traveling wave operation with an effective modulation frequency response band exceeding 50 GHz was achieved. As a result, practical 50 Gb/s-NRZ (Non Return to Zero) optical modulation characteristics having a satisfactory eye aperture were achieved by this configuration.

Second Exemplary Embodiment

Figure 3:
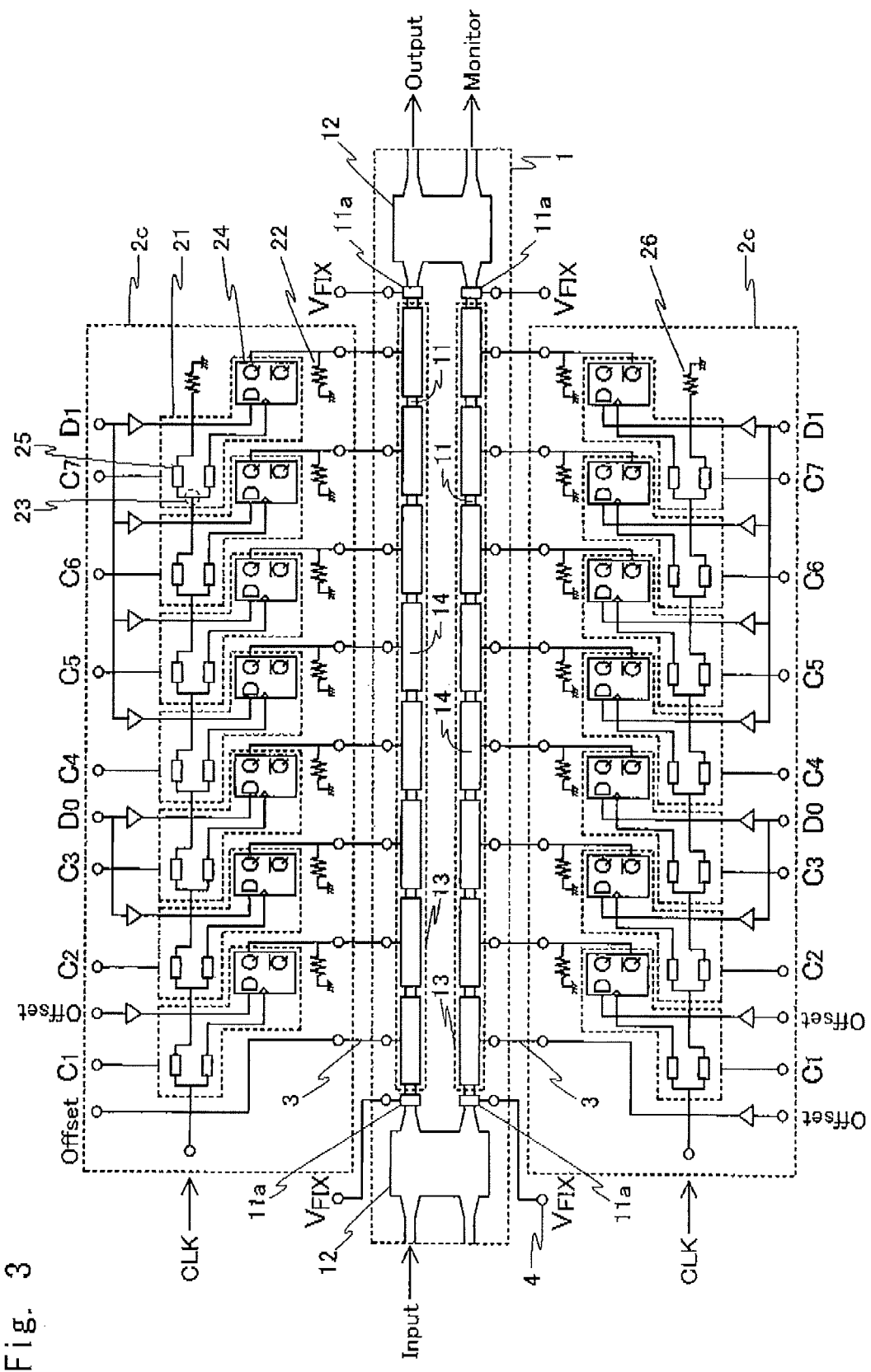
FIG. 3 is a block diagram of a digital segmented electrode structure programmable multilevel optical modulator, module according to a second exemplary embodiment.

Next, a digital segmented electrode structure programmable multilevel optical modulator module 200 according to a second exemplary embodiment will be described. FIG. 3 is a block diagram of the digital segmented electrode structure programmable multilevel optical modulator module 200. As shown in FIG. 3, the digital segmented electrode structure programmable multilevel optical modulator module 200 has a configuration in which the integrated circuit 2a of the digital segmented electrode structure multilevel optical modulator module 100 is replaced with an integrated circuit 2c. In the integrated circuit 2c, an input interface for a digital input signal is changed so as to select $2^{(m-1)}$ stages of waveguide-type optical phase modulator regions to be driven, unlike the integrated circuit 2a The D terminal of the individual driving circuit connected to the second-stage waveguide-type optical phase modulator region 14 receives the offset signal Offset, for example. The subsequent stages respectively receive digital input signals $D_0$ to $D_1$.

In the OFDM, QAM, optical PSK (Phase Shift Keying) modulation, DPSK (Differential Phase Shift Keying) or optical QPSK (Quadrature Phase Shift Keying) modulation, or DQPSK (Differential Quadrature Phase Shift Keying), the amount of phase shift to be applied to the modulated optical signal may be preferably controlled per $\pi/2^{(n-1)}$ stages. For this reason, the preceding stage of the digital data input of the driving circuit is provided with a 1-input/2(n−1)–output fan-out so that the segmented waveguide-type optical phase modulator regions 14 can be divided into groups for one stage, two stages, four stages, . . . and $2^{(n-1)}$ stages and can be driven in groups. The other components are similar to those of the digital segmented electrode structure multilevel optical modulator module 100, so the description thereof is omitted.

When attention is paid to one digital segmented electrode optical phase modulator incorporated in a pair of delay paths of the MZ interferometer, the digital segmented electrode optical phase modulator achieves the same operation as that in the case where an analog electric output of a digital-to-analog converter in an electric circuit is correlated with the phase of optical signal as described above.

Subsequently, the operation of the digital segmented electrode structure programmable multilevel optical modulator module 200 will be described. In the digital segmented electrode structure programmable multilevel optical modulator module 200, $2^{(k-1)}$ individual driving circuits 21 are driven in groups using the same logic by the k-th digital input signal $D_k$, thereby making it possible to discretely designate the total phase shift amount of the modulated optical signal using the k digital input signals. This achieves the same function as the replacement of the analog electric signal output with the optical phase in the digital-to-analog converter.

According to this configuration, the function of replacing the group driving combination with a binary number can be achieved. As a result, in the case of using the digital segmented electrode structure programmable multilevel optical modulator module 200, digital multilevel optical modulation focusing only on the combination of phase shift amounts of $\pi/2^{(n-1)}$ can be achieved regardless of the specific position and number of the waveguide-type optical phase modulator regions 14 to be driven in groups.

Note that the digital segmented electrode structure programmable multilevel optical modulator module 200 can adjust the offset in the phase shift amount by applying a separate voltage signal to the electrodes of the waveguide-type optical phase modulator regions 14 which need not be driven, as in the digital segmented electrode structure multilevel optical modulator module 100.

Second Example

A second example is an example of operation verification of the digital segmented electrode structure programmable multilevel optical modulator module 200 according to the second exemplary embodiment. The configurations of the digital segmented electrode structure optical modulator 1 and the individual driving circuits 21 in the second example are similar to those of the first example.

In this configuration, when independent digital electric signals of 25 Gb/s-NRZ were respectively input to two data input terminals of the digital segmented electrode multilevel optical modulator in accordance with a clock input signal of 25 Gb/s, a favorable optical QPSK modulation of 25 GBaud/s (1 Baud=2 bits) was achieved in which a phase error and an amplitude error were ideally suppressed with respect to optical signal having a wavelength of 1550 nm.

Third Exemplary Embodiment

Figure 4:
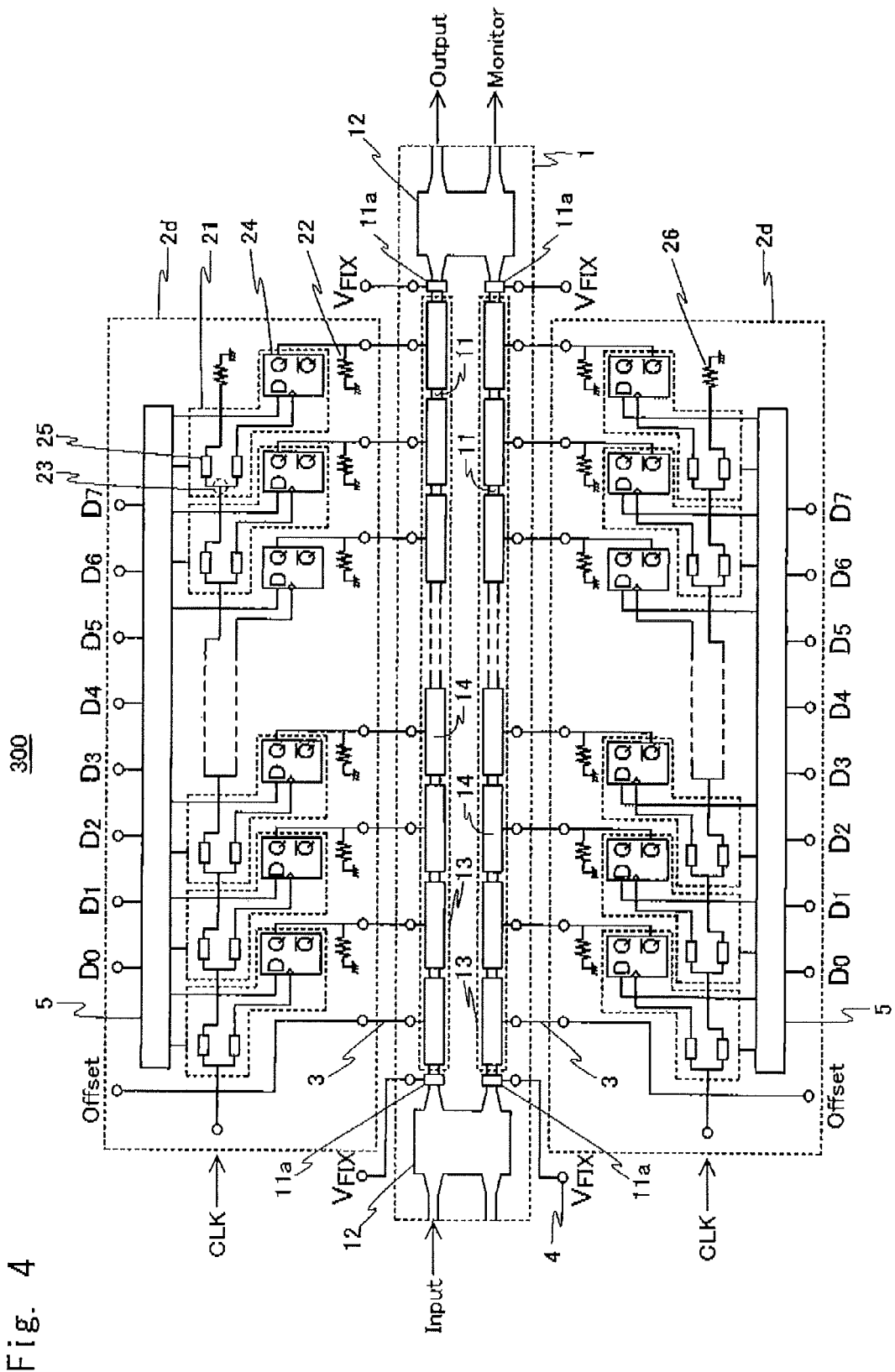
FIG. 4 is a block diagram of a digital segmented electrode structure programmable multilevel optical modulator module according to a third exemplary embodiment.

Next, a digital segmented electrode structure programmable multilevel optical modulator module 300 according to a third exemplary embodiment will be described. FIG. 4 is a block diagram of the digital segmented electrode structure programmable multilevel optical modulator module 300. As shown in FIG. 4, the digital segmented electrode structure programmable multilevel optical modulator module 300 has a configuration in which the integrated circuit 2a of the digital segmented electrode structure multilevel optical modulator module 100 is replaced with an integrated circuit 2d.

In the integrated circuit 2d, the digital segmented electrode structure optical phase modulators 13 are segmented into 256 waveguide-type optical phase modulator regions 14, for example. The individual driving circuits 21 are each connected to an arithmetic circuit 5. The arithmetic circuit 5 receives eight digital input signals $D_0$ to $D_7$, for example, and generates digital signals for driving the 256 waveguide-type optical phase modulator regions 14, which are provided in the digital segmented electrode structure optical phase modulators 13, according to the operation results based on these signals. The other components are similar to those of the digital segmented electrode structure multilevel optical modulator module 100, so the description thereof is omitted.

Subsequently, the operation of the digital segmented electrode structure programmable multilevel optical modulator module 300 will be described. In the digital segmented electrode structure programmable multilevel optical modulator module 300, the arithmetic circuit 5 controls each waveguide-type optical phase modulator region 14 based on preprogrammed parameters and the input digital input signals. Examples of the parameters herein described include correction coefficients of physical quantities, such as the dependence of the modulated optical signals on the intensity, wavelength, and environmental temperature, or their changes with time, the dependence of the transmission characteristics of the optical fiber on the path and distance (such as wavelength dispersion and polarization dispersion), optical modulation characteristics of the waveguide-type optical phase modulator regions due to production variations, and reception sensitivity on the optical receiver side, each of which affects the optical fiber transmission characteristics under the environments and conditions in which the digital segmented electrode structure multilevel optical modulator module is actually used, or coefficients unique to each multilevel optical modulation system used for an operation algorithm upon generation of various multilevel optical modulation codes.

In this configuration, the provision of the arithmetic circuit 5 that performs digital processing enables switching of the above-mentioned processing (compensation of the optical signal intensity dependence, the wavelength dependence, the environmental temperature dependence, variations in element optical modulation characteristics, and their changes with time, or change of multilevel optical modulation coding) without using any analog circuit. That is, the above-mentioned processing can be achieved simply by rewriting the parameters to be input to the arithmetic circuit 5 in a software manner without changing or adjusting hardware.

This configuration enables automation of the most part of inspection/adjustment works during manufacturing and shipping processes for optical fiber communication systems to which the digital segmented electrode structure programmable multilevel optical modulator module 300 is applied. Furthermore, defective products, which are generally screened out in the manufacturing inspection process because they are below the property specifications, for example, can be saved as acceptable products satisfying requirements, by preliminarily extracting operation parameters to compensate for these defects and providing the parameters as firmware.

Additionally, there is no need to prepare various types of driving circuits (including a logical arithmetic circuit) for each optical modulation code. Accordingly, various applications can be made using one type. This leads to a considerable reduction in inventory cost and a mass production effect due to a reduction in the number of types, and thus considerable cost reductions can be expected.

Moreover, an adjustment to an optimum operation state (a burdensome work such as voltage amplitude adjustment which is conventionally required to generate an optimum optical modulation waveform) along with a change of the operation mode in actual use (such as switching of transmission paths or wavelengths in optical networks) can also be made flexibly and efficiently. Therefore, a reduction in operational cost can be expected.

That is, this configuration can achieve the digital segmented electrode structure programmable multilevel optical modulator module with which the comprehensive effect of reducing costs including manufacturing, inspection, and operation costs can be expected, and can also achieve the optical fiber communication system to which the digital segmented electrode structure programmable multilevel optical modulator module is applied.

In the CMOS-IC and SiGe-HBT-IC, which are excellent in mass production and high integration, it has been technically difficult to achieve a circuit that generates a digital input signal of more than 10 Gb/s at high speed through an operation, because of limitations of the operation speed. However, a digital signal processor (hereinafter referred to as "DSP") that handles high-speed digital signals of 50 Gb/s is been currently developed, and ICs capable of performing the arithmetic processing that is performed by the digital segmented electrode structure programmable multilevel optical modulator module 300 at a speed of 10 Gb/s or more can also be achieved. Therefore, the digital segmented electrode structure programmable multilevel optical modulator module 300 can carry out the above-mentioned operation at a sufficiently high speed.

Third Example

A third example is au example of operation verification of the digital segmented electrode structure programmable multilevel optical modulator module 300 according to the third exemplary embodiment. The digital segmented electrode structure programmable multilevel optical modulator module 300 according to this example has a function of generating, from a digital input signal, complex light amplitudes corresponding to multilevel optical modulations (symbols) on one-to-one basis in the multilevel optical modulations such as (differential) quadrature phase shift modulation ((D)QPSK), orthogonal frequency division multiple system (OFDM), and quadrature amplitude modulation system (QAM), which are being put to practical use in optical fiber communication systems in trunk line networks.

The arithmetic circuit 5 includes eight digital signal inputs. A high-speed DSP is used as the arithmetic circuit 5. The high-speed DSP is manufactured by a CMOS process with a gate length of 45 nm, and is able to execute multiply-accumulate operations on 16-bit data 50 billion times per second. The arithmetic circuit 5 also has a function of sequentially outputting 256 digital output signals, which are generated through the operations, to 256 terminals with a certain delay, while performing amplitude adjustment and waveform shaping. The waveguide-type optical phase modulator regions 14 can be directly driven by the 256 digital output signals (0.4 Vpp) generated by the arithmetic circuit 5. The other components are similar to those of the first example described above, so the description thereof is omitted.

In this configuration, 100 Gb/s-optical QPSK modulation, 100 Gb/s-optical DQPSK modulation, 100 Gb/s-optical OFDM modulation, 100 Gb/s-optical QAM modulation, or the like was able to be freely performed by rewriting the operation parameters to be supplied to the arithmetic circuit 5 using a program, without the need for replacement of hardware and adjustment of analog electric circuits, for example.

The dependence of the optical modulation characteristics on the light intensity, the dependence of the optical modulation characteristics on the wavelength, and the dependence of the optical modulation characteristics on the operating temperature of the digital segmented electrode structure optical phase modulators 13 were extracted to derive the operation parameters to be supplied to the arithmetic circuit 5. When the operation parameters were dynamically rewritten depending on changes in operating conditions and environments, the light intensity dependence and the wavelength dependence of the modulated optical signals were suppressed to be small enough to be practically negligible over a wide temperature range of 25° C. to 85° C. Also the effectiveness for reduction in power consumption through a non-temperature-control operation was confirmed.

Fourth Example

Figure 5:
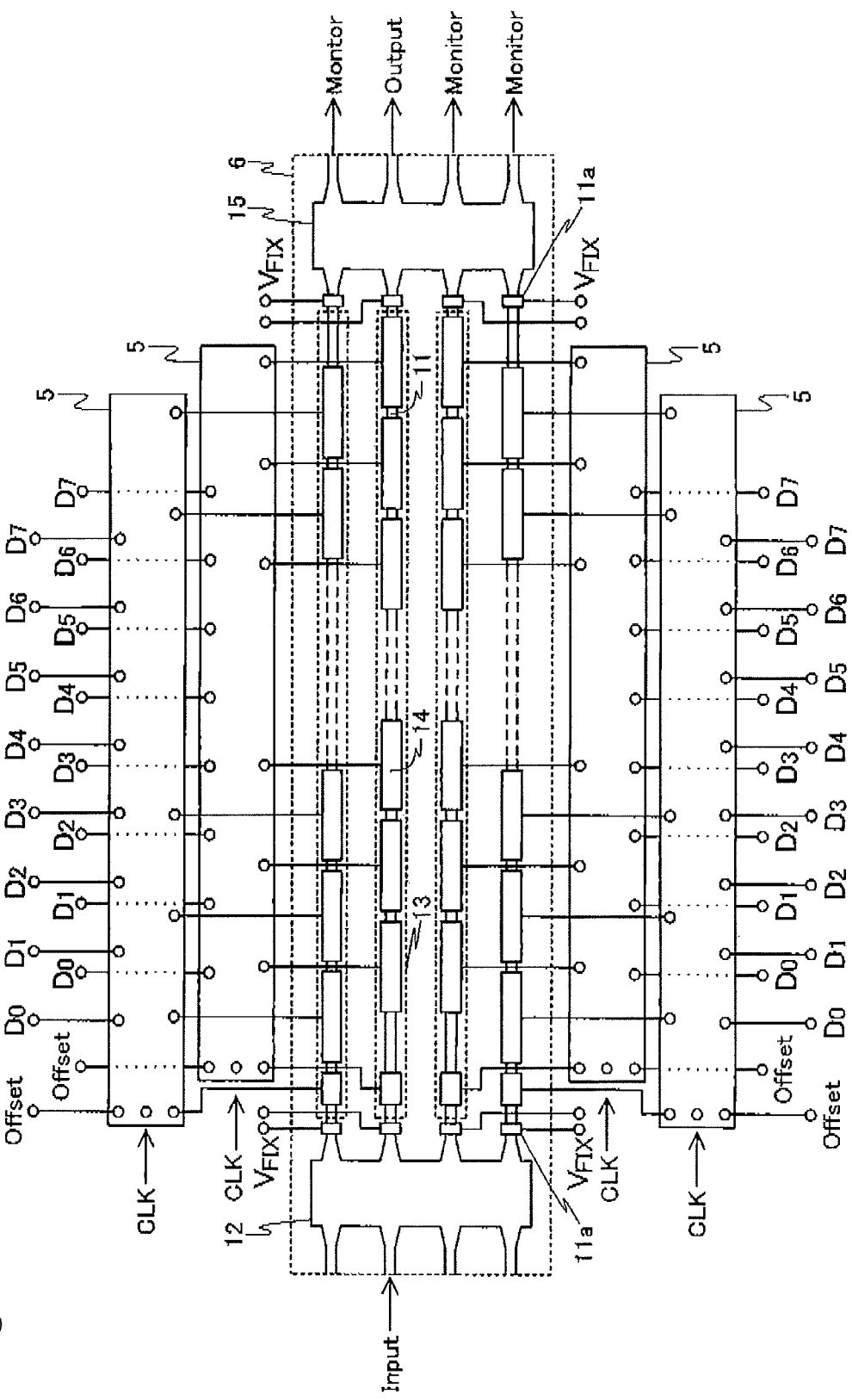
FIG. 5 is a block diagram of a digital segmented electrode structure programmable multilevel optical modulator module according to a fourth example.

A fourth example is an example of operation verification of the digital segmented electrode structure programmable multilevel optical modulator module according to the third exemplary embodiment using a digital segmented electrode structure semiconductor quadrature multilevel optical modulator and a CMOS-IC, FIG. 5 is a block diagram of a digital segmented electrode structure programmable multilevel optical modulator module 301 according to this example. As shown in FIG. 5, the digital segmented electrode structure programmable multilevel optical modulator module 301 has a configuration in which the digital segmented electrode structure optical modulator 1 of the digital segmented electrode structure programmable multilevel optical modulator module 300 is replaced with a digital segmented electrode structure optical modulator 6. Additionally, two integrated circuits are replaced with four arithmetic circuits 5. The configuration of each arithmetic circuit 5 is common to the digital segmented electrode structure programmable multilevel optical modulator module 300 and the digital segmented electrode structure programmable multilevel optical modulator module 301.

The digital segmented electrode structure optical modulator 6 is provided with four digital segmented electrode structure optical phase modulators 13. At both ends thereof, four-output/four-input optical multiplexers/demultiplexers 15 are provided. The digital segmented electrode structure optical phase modulators 13 are each segmented into 256 waveguide-type optical phase modulator regions 14, as in the third example.

In other words, the digital segmented electrode structure programmable multilevel optical modulator module 301 can perform optical quadrature modulation (optical I/Q modulation), which forms the basis of multilevel optical modulation, on the modulated optical) signal.

After the operation verification of the digital segmented electrode structure programmable multilevel optical modulator module 301, the functions similar to those of the digital segmented electrode structure programmable multilevel optical modulator module 300 according to the third example were achieved.

Note that the digital segmented electrode structure programmable multilevel optical modulator module 301 can perform optical quadrature modulation (optical I/Q modulation), unlike the digital segmented electrode structure programmable multilevel optical modulator module 300. This allows the real part and the imaginary part of the complex amplitude of the modulated optical signal to be independently correlated with the digital input signals, which is useful in terms of application of the finding of the multilevel optical modulation technique cultivated in radio communications to the multilevel optical modulation.

Fourth Exemplary Embodiment

Figure 6:
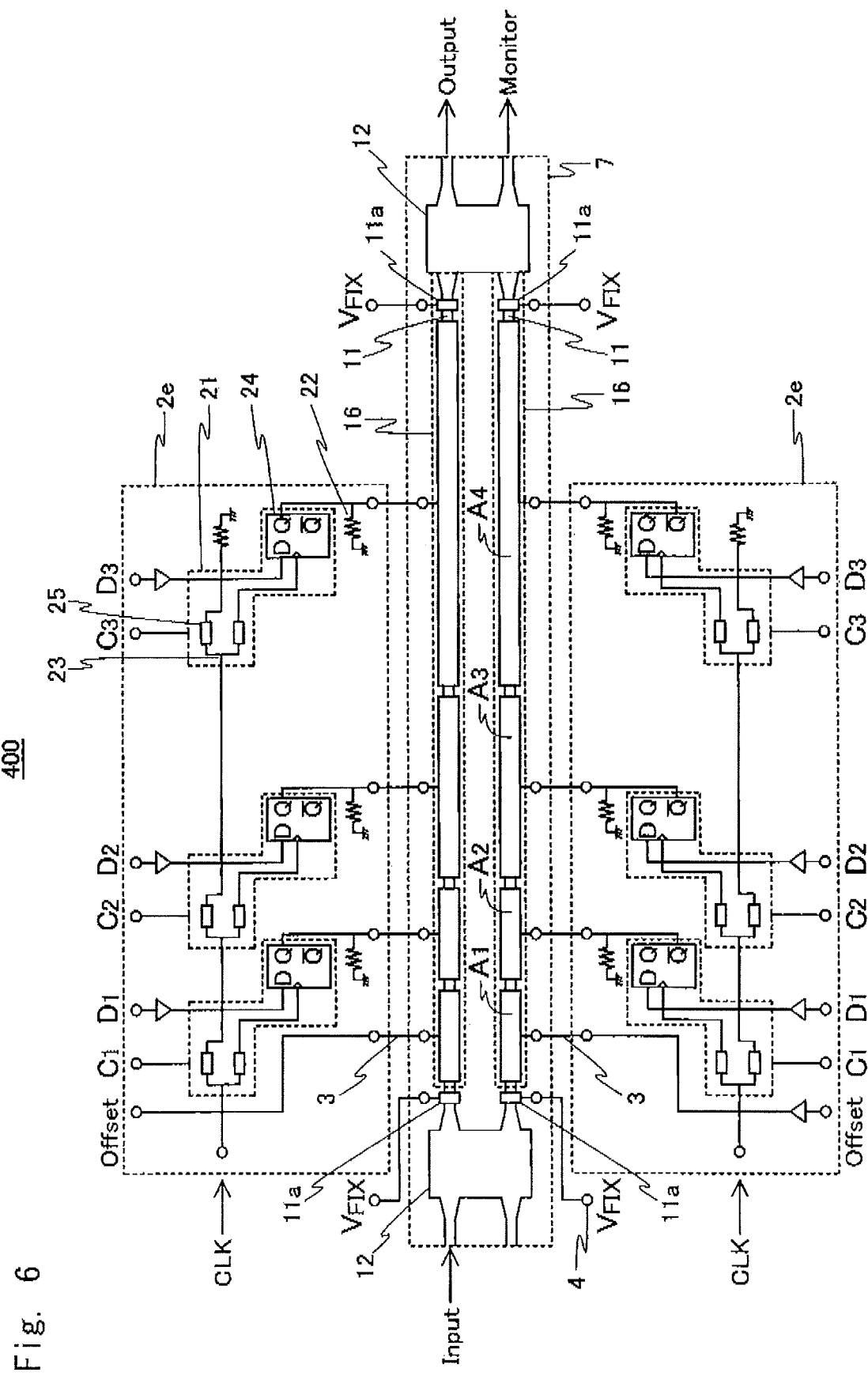
FIG. 6 is a block diagram of a digital segmented electrode structure programmable multilevel optical modulator module according to a fourth exemplary embodiment.

Next, a digital segmented electrode structure multilevel optical modulator module 400 according to a fourth exemplary embodiment will be described. FIG. 6 is a block diagram of the digital segmented electrode structure multilevel optical modulator module 400. As shown in FIG. 6, the digital segmented electrode structure multilevel optical modulator module 400 has a configuration in which the digital segmented electrode structure optical modulator 1 and the integrated circuit 2a of the digital segmented electrode structure multilevel optical modulator module 100 are respectively replaced with a digital segmented electrode structure optical modulator 7 and an integrated circuit 2e.

The digital segmented electrode structure optical modulator 7 has an MZ interferometer structure including two single-mode semiconductor optical waveguides 11 and the two-input/two-output optical multiplexer/demultiplexer 12. Digital segmented electrode structure optical phase modulators 16 are respectively formed in the two semiconductor optical waveguides 11 serving as a pair of delay paths in the MZ interferometer.

The digital segmented electrode structure optical phase modulators 16 are each segmented into n waveguide-type optical phase modulator regions $A_1$ to $A_n$ to define small segments of the semiconductor optical waveguides 11. The length in the waveguide direction of the i-th waveguide-type optical phase modulator region $A_i$ counted from the input side is twice as long as that of the preceding (i−1)-th waveguide-type optical phase modulator region $A_{(i-1)}$. That is, the lengths in the waveguide direction of the waveguide-type optical phase modulator regions in the digital segmented electrode structure multilevel optical modulator module 400 are increased toward the output side by a power-of-two multiple. Note that FIG. 1 shows the case of n=4.

The integrated circuit 2e includes (n−1) individual driving circuits 21 and (n−1) terminators 22, for example. In FIG. 1, three individual driving circuits 21 and three terminators 22 are provided, because n=4. The other components are similar to those of the digital segmented electrode structure multilevel optical modulator module 100, so the description thereof is omitted.

Subsequently, the operation of the digital segmented electrode structure multilevel optical modulator module 400 will be described. In the digital segmented electrode structure multilevel optical modulator module 400, the length in the waveguide direction of the waveguide-type optical phase modulator is set to be a power-of-two multiple of a certain unit length to thereby provide a fan-out at the data input stage of the digital segmented electrode structure programmable multilevel optical modulator module 200 shown in FIG. 3. This enables the same operation as the operation of driving the power-of-two number of individual driving circuits (waveguide-type optical phase modulator regions) with the same data.

Accordingly, the number of the individual driving circuits 21 and driving signal lines to be installed can be reduced from $2^m$ to m, while maintaining the same total amount of phase shift received by the modulated optical signal as that of the digital segmented electrode structure programmable multilevel optical modulator module 200.

In this configuration, there is a possibility that the optical modulation frequency band of each waveguide-type optical phase modulator region depends on the length thereof. Accordingly, it is expected that the length dependence appears in the frequency characteristics of the phase shift received by the modulated optical signal during transmission through each waveguide-type optical phase modulator region. In this case, it may be necessary to provide some contrivance in the circuit that optimally adjusts the frequency characteristics for each of the individual driving circuits to compensate for the length dependence. Furthermore, the upper limit of the length of each waveguide-type optical phase modulator region is limited by the modulation rate of the modulation electric signal.

For this reason, the configuration of this exemplary embodiment is effective for the following cases, for example. That is, the case where the number of states of the total amount of phase shift to be applied to the non-modulated optical signal is small (for example, only four values of 0°, 90°, 180°, and 270°); the case where the chip size of each integrated circuit is suppressed by reducing the number of electrode pads whose areas cannot be neglected along with a progress in miniaturization, unlike the areas of the individual driving circuits, thereby achieving a reduction in cost; and the case where multilevel optical modulation signals are generated in the optical OFDM or optical QAM, for example, in which the multiplicity (spectral efficiency) per symbol is high and thus the optical modulation rate itself can be suppressed relatively easily.

This configuration enables application of a power-of-two multiple of phase shift to the input optical signal for each waveguide-type optical phase modulator region simply by applying a digital driving signal of a constant amplitude to each waveguide-type optical phase modulator region, without applying any driving signal whose analog value, that is, voltage amplitude, is not constant. Because the complex amplitude of optical signal follows the principle of superposition, all phase shifts of optical signals necessary for multilevel optical modulation can be easily added in optical regions simply by allowing the modulated optical signal to pass through the optical waveguides forming each waveguide-type optical phase modulator region. In this case, the same function as external programming of all the necessary phase shifts can be achieved as long as means for appropriately selecting the waveguide-type optical phase modulator regions to which the digital driving signal is applied is provided.

In this manner, the circuit in which a plurality of identical driving circuits that output only digital electric signals instead of analog electric signals are integrated; a selection as to whether to output digital electric signals from the driving circuits is programmed; and the driving circuits control the output timing of each digital electric signal according to a constant synchronization signal has an extremely high compatibility with ICs to which the CMOS or SiGe-HBT process is applied. Therefore, miniaturization, lower power consumption, low cost, and multiple functions of the driving circuits themselves can be expected.

The use of such features enables adjustment of temperature characteristics unique to optical modulator modules, adjustment of modulated light waveforms, correction of the dependence of optical modulation characteristics on the wavelength, addition of error correction codes, and static or dynamic correction of production variations of the optical modulator elements themselves through operations. This facilitates achievement of an improvement in production yield of elements, automation of adjustment work for optimum driving conditions, adjustment of characteristics under actual use, upgrading of functions, and the like simply by changing programs. This is advantageous in terms of cost reduction and extensibility.

Fifth Example

A fifth example is an example of operation verification of the digital segmented electrode structure multilevel optical modulator module according to the fourth exemplary embodiment using a digital segmented electrode structure semiconductor multilevel optical modulator and a CMOS-IC. In the fifth example, the digital segmented electrode structure multilevel optical modulator module 400 shown in FIG. 6 has a configuration in which the lengths of the waveguide-type optical phase modulator regions of the digital segmented electrode structure semiconductor multilevel optical modulator are respectively set to 100 µm, 200 µm, and 400 µm from the input side, which are a combination of lengths corresponding to power-of-two multiples of the unit length of 100 µm. As a result, the number of the individual driving circuits 21 was able to be reduced from 7 to 3, as compared to the first example or the second example. Accordingly, the number of the driving signal lines 3 and the number of the terminators 22 were able to be reduced from 7 to 3 in the same manner. Therefore, the fan-out provided at the preceding stage of the data input of each individual driving circuit as illustrated in the second example can be omitted. As for the layered structure, the transition wavelength was set to 1430 nm by changing the wavelength composition of the multiple quantum-well structure. By these contrivances, the chip size of the integrated circuit 2e was suppressed to ½ as compared to the integrated circuit 2c of the second example.

In this example, the wavelength composition of the multi-quantum well layer was set to 1430 nm, and thus a longer wave than 1550 nm of the second example was set. Accordingly, the ratio of a change in refractive index which affects the optical signal having the wavelength of 1550 nm to an applied voltage was twice that of the second example. This resulted in achievement of the same modulation characteristics as the modulation characteristics that were achieved in the digital segmented electrode structure programmable multilevel optical modulator module 200 according to the second example.

Fifth Exemplary Embodiment

Figure 7:
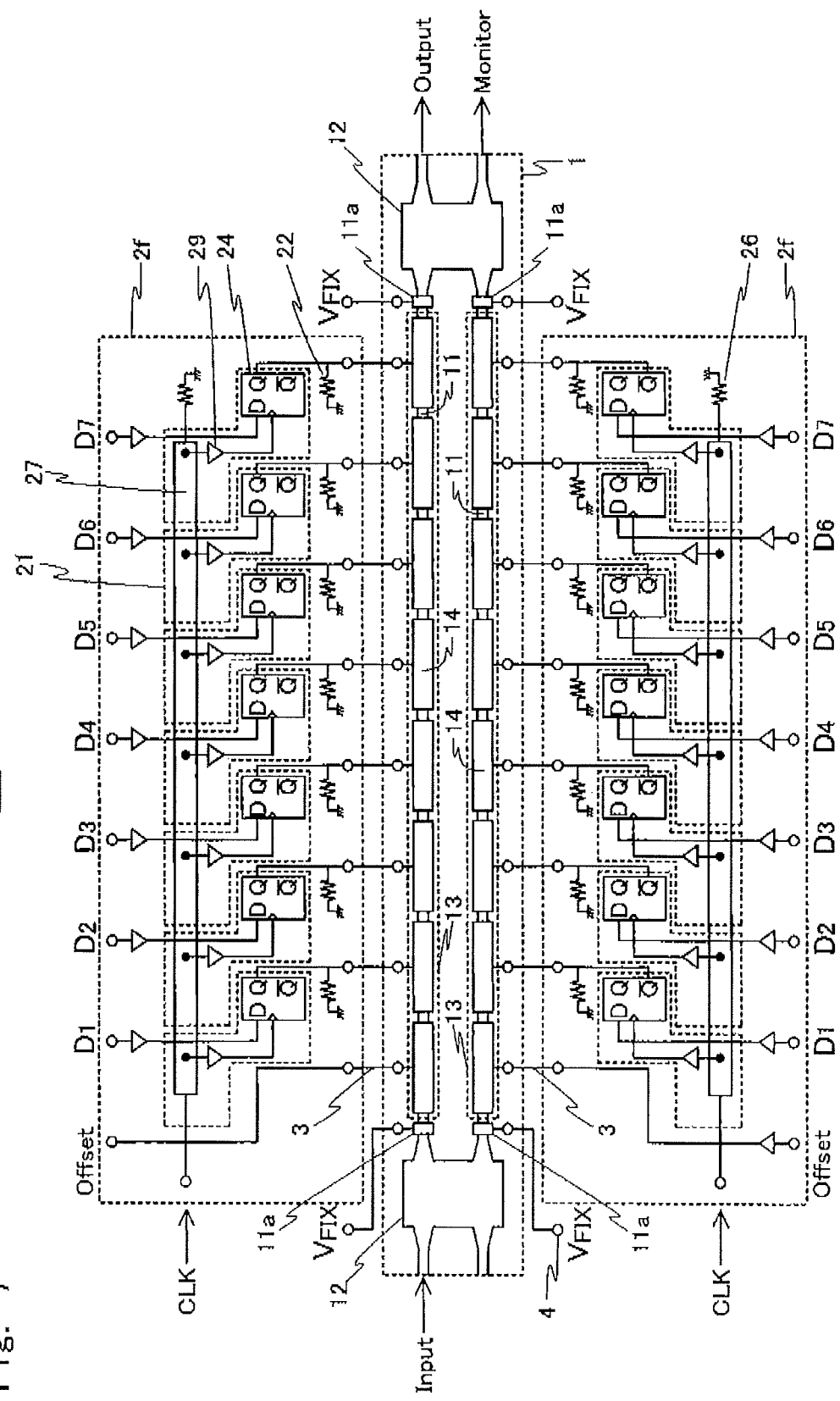
FIG. 7 is a block diagram of a digital segmented electrode structure programmable multilevel optical modulator module according to a fifth exemplary embodiment.

Next, a digital segmented electrode structure programmable multilevel optical modulator module 500 according to a fifth exemplary embodiment will be described. FIG. 7 is a block diagram of the digital segmented electrode structure programmable multilevel optical modulator module 500. As shown in FIG. 7, the digital segmented electrode structure programmable multilevel optical modulator module 500 has a configuration in which the integrated circuit 2a of the digital segmented electrode structure multilevel optical modulator module 100 is replaced with an integrated circuit 2f. The other components are similar to those of the digital segmented electrode structure multilevel optical modulator module 100, so the description thereof is omitted.

The integrated circuit 2f has a configuration in which the phase shift circuits 25 of the integrated circuit 2a are replaced with a single transmission line 27. The other components of the integrated circuit 2f are similar to those of the integrated circuit 2a, so the description thereof is omitted.

Subsequently, the operation of the digital segmented electrode structure programmable multilevel optical modulator module 500 will be described. For example, when active elements are used for the phase shift circuits 25 that specify a delay time between adjacent individual driving circuits 21 in the digital segmented electrode structure multilevel optical modulator module 100, there is an advantage that the delay time is electrically variably controllable. Meanwhile, there is a possibility that a variation between production lots or an in-plane ununiformity over the substrate due to manufacturing processes and the like appears in the delay time. There is another possibility th0113 a temperature dependence appears in the delay time. This raises a concern of an adverse effect on the optical modulation characteristics.

On the other hand, in this configuration, the simple transmission line 27 is used and thus the phase shift circuit includes no active element. In this case, the delay time has a value obtained by dividing the length of the transmission line 27 by the propagation speed of the clock signal. In this configuration, the propagation rate (delay time) of the transmission line itself cannot be electrically controlled. However, it can be expected that the effects of the dependence of the propagation speed (delay time) on the operating temperature and variations due to manufacturing processes can be both suppressed to be small enough to be practically negligible. The propagation speed in the transmission line 27 is approximately 10 fsec/µm, though it depends on the cross-section structure of the transmission line. The delay time is proportional to the length of the transmission line. Accordingly, when the layout design for the length of the transmission line 27 is performed with a precision of 0.1 µm, a variation in the delay time can be suppressed within about 1 fsec. This is about two orders of magnitude smaller than that of a variation in the operation speed of an active circuit, and is small enough to be practically negligible.

In an actual configuration, a branch circuit may be disposed between (N-1) transmission lines connected in cascade. To facilitate the design of the branch circuit, all the (N-1) transmission lines are seamlessly connected together. Another configuration may be employed in which buffer circuits having high input impedance are shunt-connected at certain intervals to extract a synchronization signal (clock signal). Note that the fundamental operation of the digital segmented electrode structure programmable multilevel optical modulator module 500 is basically the same as that of the digital segmented electrode structure multilevel optical modulator module 100 described above, so the description thereof is omitted.

This configuration is not equipped with the function of electrically controlling the delay time of the phase shift circuit (transmission line 27). However, it is obvious that a configuration having such a control function is practical. This control function can be achieved easily by changing the phase of the synchronization signal (clock signal) supplied to the individual driving circuits 21. To achieve this, it is necessary to separately generate clock signals shifted by a phase in proportion to a shift width of the delay time with respect to the phase of the synchronization signal (clock signal) of the modulation electric signal, exclusively for each of the individual driving circuits 21. As means to achieve this, a voltage variable phase shifter is configured by applying a phase interpolator, for example; to electrically control the phase of the clock signal. It is obvious that such a phase interpolator can be monolithically integrated on the same semiconductor substrate as the driving circuit.

Sixth Example

A sixth example is an example of operation verification of the digital segmented electrode structure programmable multilevel optical modulator module according to the fifth exemplary embodiment using a digital segmented electrode structure semiconductor multilevel optical modulator and a CMOS-IC. In the sixth example, the digital segmented electrode structure programmable multilevel optical modulator module 500 shown in FIG. 7 has a configuration in which the phase shift circuit (transmission line 27) is formed of microstrip lines monolithically integrated on the CMOS-IC. In addition to the microstrip lines, transmission lines widely used in microwave circuits, such as coplanar waveguides, can also be applied as the transmission lines forming the phase shift circuit. Buffer circuits 29 having high input impedance are shunt-connected with the transmission line 27 at the positions where the clock signal excited from the input terminal to the transmission line 27 reaches at the delay time, so as to supply the clock signal to each of the individual driving circuits 21 with an appropriate delay time. Each of the buffer circuits 29 incorporates a voltage variable phase interpolator (not shown), which enables electrical control of the phase shift amount.

In this example, the dependence of the delay time of the phase shift circuit (transmission line 27) on the temperature was suppressed to ±0.05%, which is small enough to be practically negligible, over a wide temperature range of 0° C. to 85° C. To compensate for the temperature characteristics indicated by the optical modulation characteristics of the waveguide-type optical phase modulator regions 14 according to the operating temperature, the previous temperature of the digital segmented electrode structure semiconductor multilevel optical modulator was monitored to appropriately control the driving voltage amplitude and the bias voltage. As a result, the same modulation characteristics as those that were achieved in the digital segmented electrode structure programmable multilevel optical modulator module 200 according to the second example were able to be achieved over the wide temperature range of 0° C. to 85° C.

Sixth Exemplary Embodiment

Figure 8:
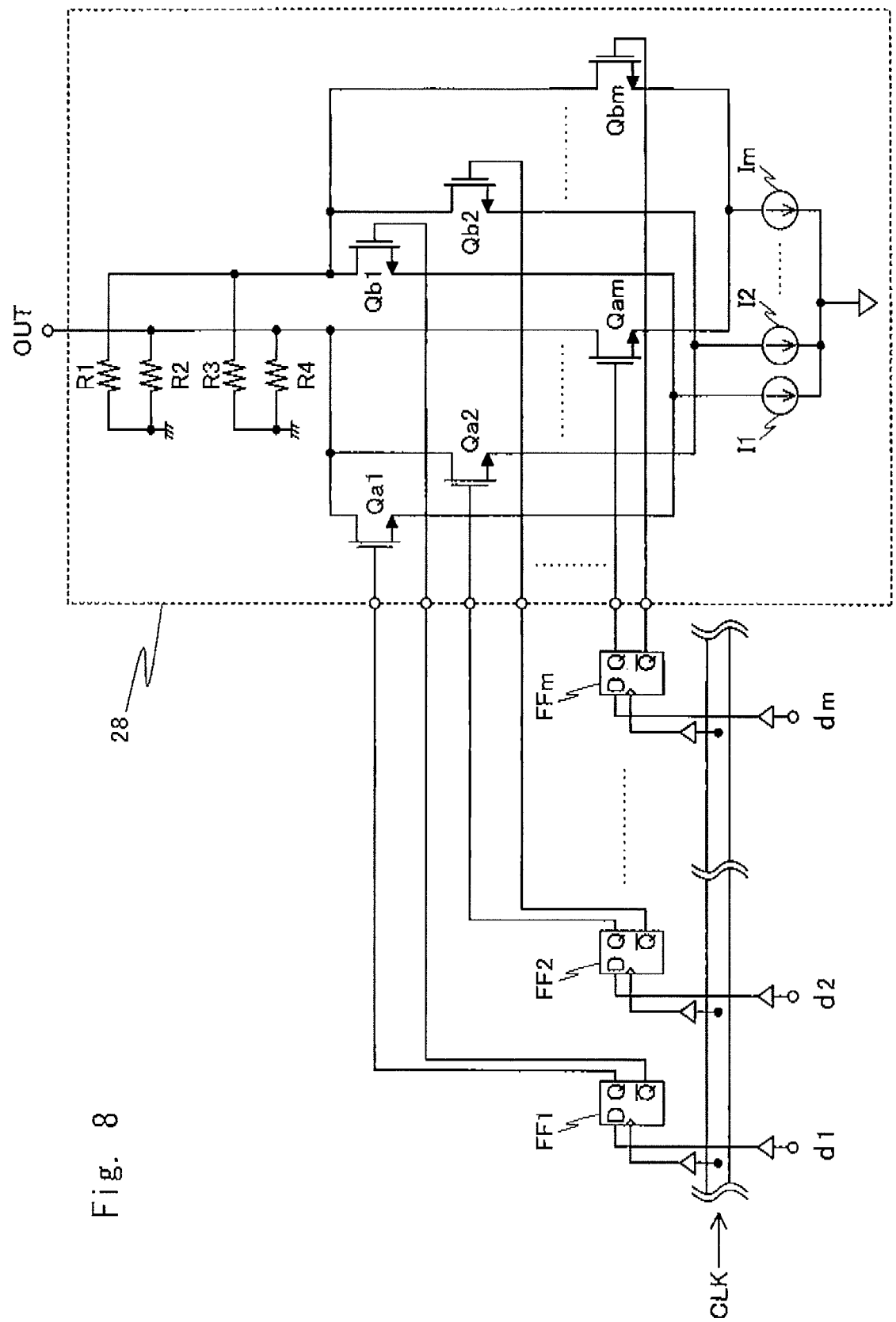
FIG. 8 is a block diagram showing a configuration of an individual driving circuit of a digital segmented electrode structure programmable multilevel optical modulator module according to a sixth exemplary embodiment.

Next, a digital segmented electrode structure programmable multilevel optical modulator module 600 according to a sixth exemplary embodiment will be described. FIG. 8 is a block diagram showing the configuration of one of the individual driving circuits 21 of the digital segmented electrode structure programmable multilevel optical modulator module 600. As shown in FIG. 8, the individual driving circuit 21 has a configuration in which the output stage is divided into m (in is an integer equal to or greater than 3) micro driving circuits $FF_1$ to $FF_m$ and output voltage amplitudes of the micro driving circuits $FF_1$ to $FF_m$ can be combined (added). This configuration allows the modulation voltage amplitudes of the individual driving circuits 21 to be multileveled in appearance.

The individual driving circuit 21 includes the m micro driving circuits $FF_1$ to $FF_m$, each of which is connected to the transmission line 27, and an adding circuit 28.

Each of the micro driving circuits $FF_1$ to $FF_m$ outputs an output signal to the adding circuit 28 according to the clock signal CLK and digital input signals $d_1$ to $d_m$.

The adding circuit 28 includes transistors $Qa_1$ to $Qa_m$, transistors $Qb_1$ to $Qb_m$, resistors $R_1$ to $R_4$, and current sources $I_1$ to $I_m$. The drains of the transistors $Qa_1$ to $Qa_m$ are connected to an output terminal OUT. The drains of the transistors $Qb_1$ to $Qb_m$ are connected to a ground through the resistors $R_1$ and $R_3$. The gate of a transistor $Qa_q$ (q is an integer satisfying $1 \leq q \leq m$) is connected to one output of a micro driving circuit $FF_q$. The gate of a transistor $Qb_q$ is connected to the other output of the micro driving circuit $FF_q$. The sources of the transistor $Qa_q$ and the transistor $Qb_q$ are connected to the ground through a current source $I_q$. The resistors $R_2$ and $R_4$ are connected between the output terminal OUT and the ground.

Subsequently, the operation of the digital segmented electrode structure programmable multilevel optical modulator module 600 will be described. The fundamental operation thereof is basically the same as that of the digital segmented electrode structure programmable multilevel optical modulator module 500 described above, except that the individual driving circuits 21 can output the modulation voltage amplitude as a multi-level instead of a binary level. Accordingly, the description of the digital segmented electrode structure multilevel optical modulator itself is omitted.

In order to increase the modulation level or multiplicity of the optical modulation signal in the digital segmented electrode structure programmable multilevel optical modulator module 500, the number (number of the segmented regions) of the waveguide-type optical phase modulator regions 14 connected in cascade may be increased to thereby increase the number of states of the multiple modulation levels (the amplitude and phase of the modulated optical signal). However, the upper limit of the number of the segmented regions is limited by the size of an IC forming each of the optical modulator and the driving circuit and the size of each electrode pad. For example, assuming that the length of one side of the IC is 5 mm and the electrode pad pitch is 100 µm, the number of electrode pads to be arranged on one side of the IC is less than 50. Further, it is necessary to arrange an appropriate number of electrode pads for power supply between electrode pads for driving signal output of the individual driving circuits 21. Accordingly, the upper limit of the practical number of electrodes to be allocated for driving the waveguide-type optical phase modulator regions 14 is limited to about 30. If multiple-row electrode pads are arranged along the outer periphery of the IC, the number of electrode pads to be allocated for driving signal output of the individual driving circuits can be increased. However, the practical range is considered to be about 2 to 4 rows in view of the layout of circuits and electrode lines. As a result, the number (number of the segmented regions) of the waveguide-type optical phase modulator regions 14 is estimated to fall within the range of about 64 to 128. In the future full-scale implementation of a multiple optical modulation system such as optical OFDM, it is desirable to achieve a larger number of states. However, there is a concern that the requirement of extensibility cannot be satisfied merely by increasing the number (number of the segmented regions) of the waveguide-type optical phase modulator regions 14.

On the other hand, according to this configuration, the output voltage amplitude of the driving signal of each of the individual driving circuits 21 can be set to an m value instead of a binary value. In this case, the modulation level (multiplicity) of the modulated optical signal is given by the product of the modulation level m of the output voltage amplitude and the number (number of the segmented regions) N of the waveguide-type optical phase modulator regions 14. This enables multilevel (multiplexed) optical modulation with a modulation level (multiplicity) exceeding the upper limit of the actual number of electrode pads to be allocated for driving signal output of the individual driving circuits 21.

As means for allowing the output voltage amplitude to be multileveled, a current switch circuit can be used, for example. The current switch circuit has a configuration in which in constant current sources are connected in parallel based on a current mode logic circuit (CML) and a j-th constant current source ($1 \leq j \leq m$, j is a natural number) is controlled to be turned on/off by the output of a j-th micro driving circuit. In this case, the voltage amplitude appearing at the output terminal OUT of the individual driving circuit 21 is given by (terminating resistance)×(current sum of turned-on constant current sources connected in parallel). A configuration in which all amplitudes of the m constant current sources are set to be equal to each other is considered to be advantageous for the high-speed operation, because the frequency response of the current switch circuit described above can be easily maintained constant, though the modulation level of the output voltage amplitude falls within a (m+1) value.

On the other hand, when the current amplitude of each of the m constant current sources is set to a power-of-two multiple of a certain unit current to implement a current addition type D/A converter, an output voltage amplitude having a degree of level corresponding to the m-th power of 2 can be obtained. This is advantageous for suppression of the circuit size, but the current amplitude at a maximum operating frequency is limited by the frequency response of the current switch circuit that turns on/off the path to which a maximum constant current source is connected. In this case, however, if the level of the output voltage amplitude of the individual driving circuit 21 is set to the m-th power of 2, the actual modulation speed can be reduced to 1/(m−1) as compared to the case of the binary digital modulation. Accordingly, the problem of limitation by the frequency response described above is practically negligible. Note that there is another possibility that the amplitude of each constant current source slightly varies due to manufacturing processes. As a countermeasure against this, a function for allowing electrical fine adjustment in the setting of amplitudes of all constant current sources. As means to achieve this, D/A converters may be respectively connected to amplitude fine adjustment terminals of all constant current sources, and the control signals may be set by digital signals using a program. This configuration is practical because it can cope with variations in amplitude of the constant current sources due to manufacturing processes and degradation of the elements with time.

Seventh Example

A seventh example is an example of operation verification of the digital segmented electrode structure programmable multilevel optical modulator module according to the sixth exemplary embodiment using a digital segmented electrode structure semiconductor multilevel optical modulator and a CMOS-IC. In the seventh example, seven constant current sources and seven current switch circuits are respectively connected to the outputs of the D-type flip-flop circuits of the individual driving circuits 21. Additionally, the seven constant current sources are respectively connected with independent D/A converters for amplitude setting (not shown), and have a function capable of controlling the D/A converters using external digital signals.

In this example, when the amplitudes of all the seven constant current sources are set to 1.6 mA, the modulation level of the output voltage amplitude of the individual driving circuit is given by the value of 7+1=8, and the maximum value is given by 1.6 mA×7×50 Ω=560 mV. The modulation level of the multilevel optical modulation signal is given by the product (=2,040 levels) of the modulation level (7+1=8 value) of the output voltage amplitude of the individual driving circuit 21 and the number of stages (255 stages) of the waveguide-type optical phase modulator regions 14. When the amplitudes of the seven constant current sources are respectively set to 0.1 mA, 0.2 mA, . . . 6.4 mA, which are in a power-of-two multiple relationship, the modulation level of the output voltage amplitude of the individual driving circuit 21 is given by the value of $2^7$=128, and the maximum value thereof is given by 12.7 mA×50Ω=635 mV. Similarly, the modulation level of the multilevel optical modulation signal is given by the product (=32,640 levels) of the modulation level ($2^7$=128 value) of the output voltage amplitude of the individual driving circuit 21 and the number of stages (255 stages) of the waveguide-type optical phase modulator regions 14. With this configuration, ideal 16 optical modulation operations were achieved. It is obvious that this configuration of the individual driving circuit 21 can also be applied to a digital division electrode multilevel optical modulator for an optical quadrature modulation system.

Seventh Exemplary Embodiment

Figure 9:
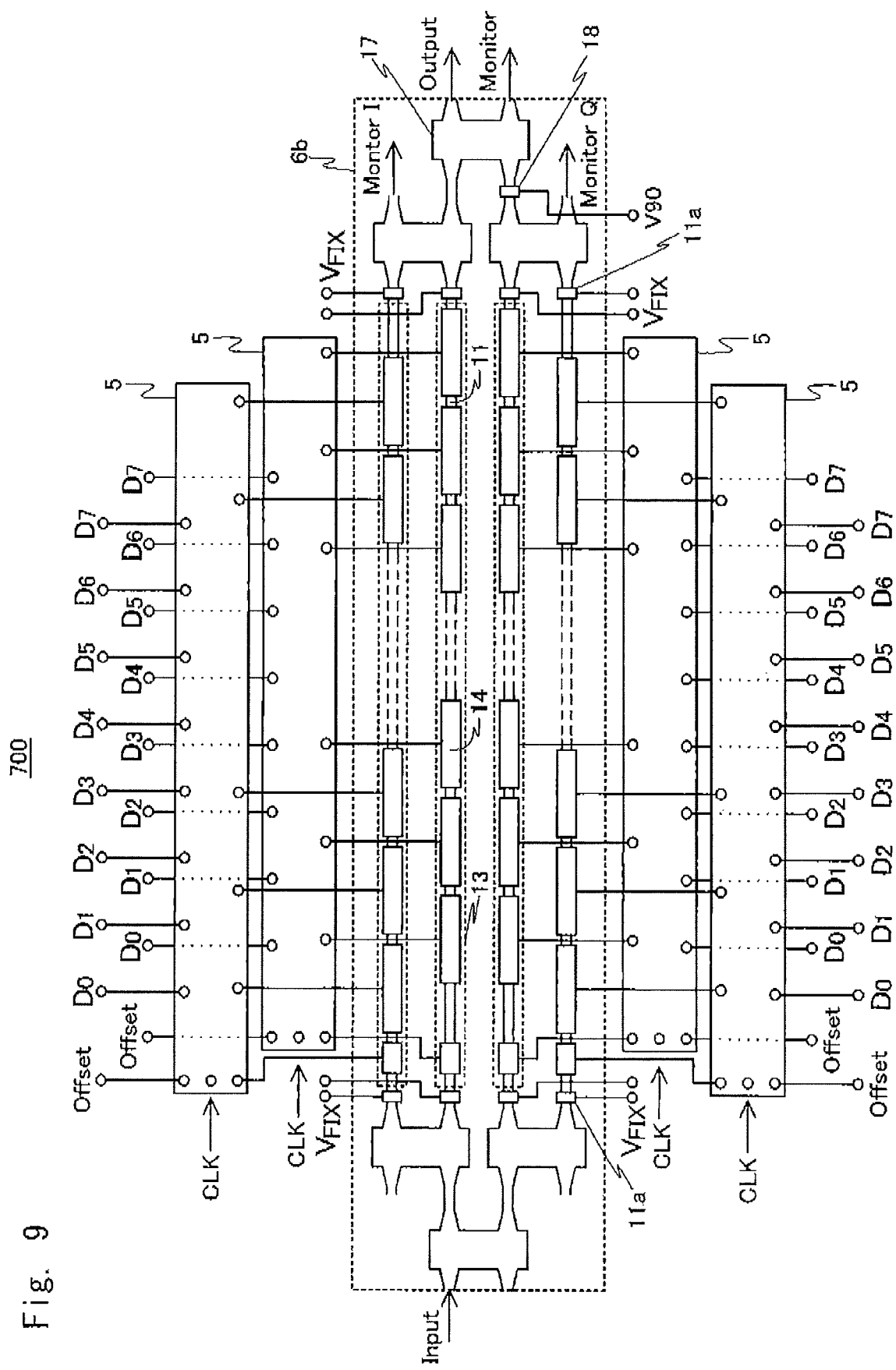
FIG. 9 is a block diagram of a digital segmented electrode structure programmable multilevel optical modulator module according to a seventh exemplary embodiment.

Next, a digital segmented electrode structure programmable multilevel optical modulator module 700 according to a seventh exemplary embodiment will be described. FIG. 9 is a block diagram showing the configuration of the digital segmented electrode structure programmable multilevel optical modulator, module 700. The digital segmented electrode structure programmable multilevel optical modulator module 700 has a configuration in which the digital segmented electrode structure optical modulator 6 of the digital segmented electrode structure programmable multilevel optical modulator module 301 according to the fourth example is replaced with a digital segmented electrode structure optical modulator 6b. The other components of the digital segmented electrode structure programmable multilevel optical modulator module 700 are similar to those of the digital segmented electrode structure programmable multilevel optical modulator module 301, so the description thereof is omitted.

In the digital segmented electrode structure optical modulator 6b, each of the four-input/four-output optical multiplexers/demultiplexers 15 of the digital segmented electrode structure optical modulator 6 is achieved by combining three two-input/two-output optical multiplexers/demultiplexers 17. Optical phase shifter 18 is disposed at an optical waveguide portion immediately before the combination of I-channel and Q-channel modulated optical signals in the output-side optical multiplexers/demultiplexers 17. The optical phase shifter 18 is connected to a control electrode V90. Additionally, a mechanism (not shown) for monitoring the spectrum of the output of modulated optical signals is provided. The other components are similar to those of the digital segmented electrode structure optical modulator 6, so the description thereof is omitted.

Figure 10A:
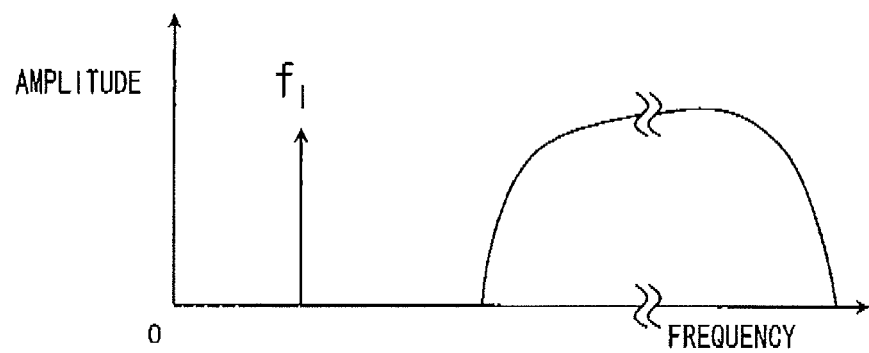
FIG. 10A is a graph showing a spectrum of a modulated optical signal of the digital segmented electrode structure programmable multilevel optical modulator module according to the seventh exemplary embodiment.
Figure 10B:
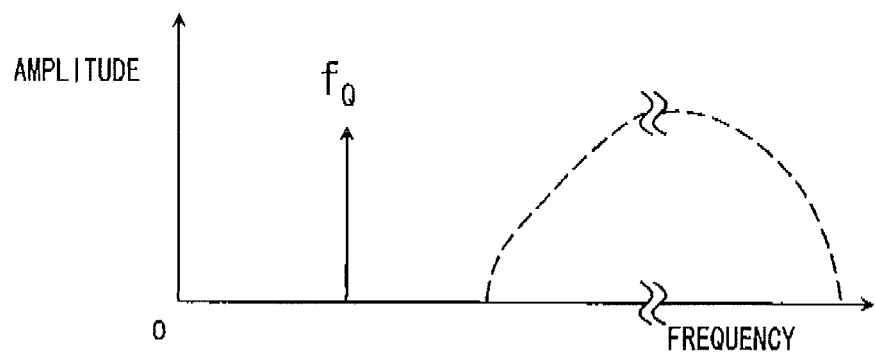
FIG. 10B is a graph showing a spectrum of a modulated optical signal of the digital segmented electrode structure programmable multilevel optical modulator module according to the seventh exemplary embodiment.
Figure 10C:
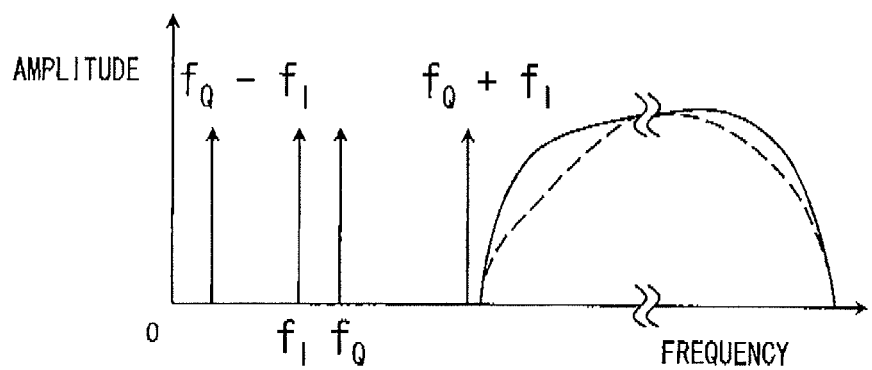
FIG. 10C is a graph showing a spectrum of a modulated optical signal of the digital segmented electrode structure programmable multilevel optical modulator module according to the seventh exemplary embodiment.
Figure 11:
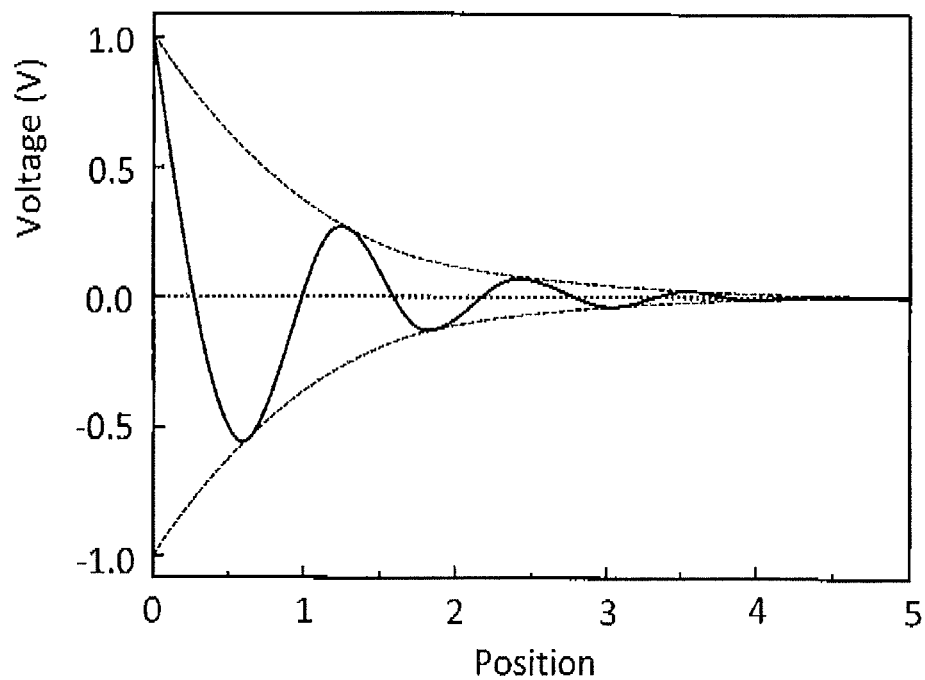
FIG. 11 is a graph showing attenuation of a modulation electric signal in an electrode of an optical modulator having a typical traveling-wave type electrode.
Figure 12:
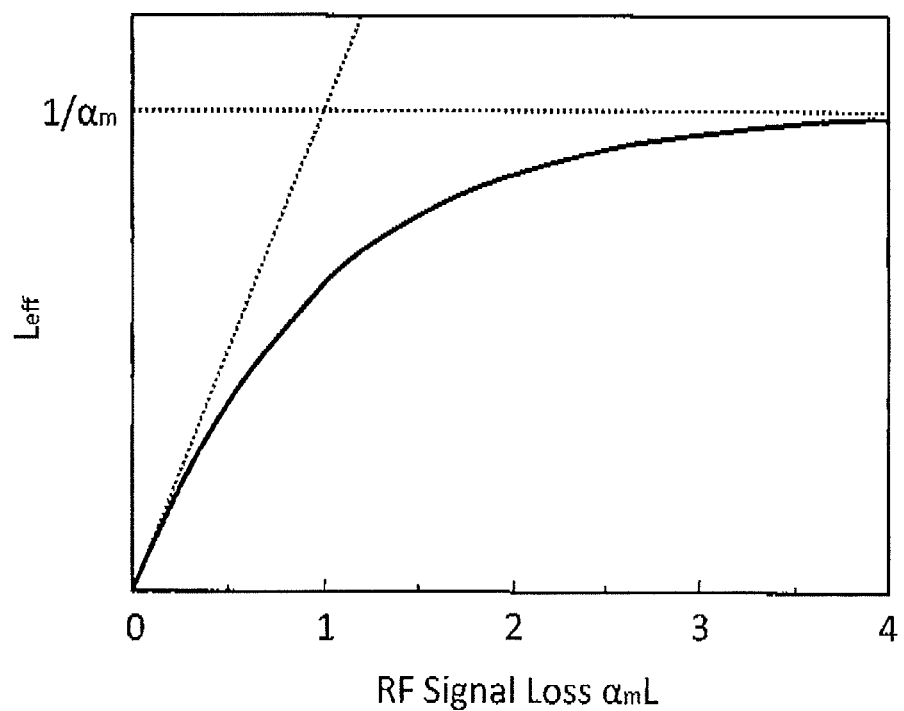
FIG. 12 is a graph showing a relation between an attenuation constant of a modulation electric signal propagating through a typical traveling-wave type electrode and an effective optical modulator length $L_{eff}$.

FIGS. 10A to 10C show spectra of modulated optical signals of the digital segmented electrode structure programmable multilevel optical modulator module 700. FIG. 10A shows the modulated optical signal spectrum of the I-channel. FIG. 10B shows the modulated optical signal spectrum of the Q-channel. FIG. 10C shows the modulated optical signal spectrum obtained after the combination of the I/Q channels.

Subsequently, the operation of the digital segmented electrode structure programmable multilevel optical modulator module 700 will be described. The fundamental operation for optical modulation is the same as that of the digital segmented electrode structure programmable multilevel optical modulator module 301 described above, except that some contrivances for monitoring the optical modulation operation and controlling the operation in an optimum state are provided. To implement the multilevel (multiplexed) optical modulation, the application of the quadrature modulation system (I/Q modulation system), the practical application of which has been preceded in microwave communications as described above, is expected.

Generally, in the quadrature modulation system, a modulated signal (carrier signal) having a certain frequency (wavelength) is branched to two channels, I-channel and Q-channel, to be modulated using independent external signals. These signals are multiplexed by shifting the phase by 90 degrees (making the signals orthogonal to each other). In this case, in order to ideally separate the I-channel and Q-channel modulation signals, which are orthogonal to each other, at the receiving terminal, it is extremely important to maintain the orthogonality between the I-channel and the Q-channel. The digital segmented electrode structure programmable multilevel optical modulator module having this configuration has a function of independently superimposing frequencies $f_I$ and $f_Q$ ($f_I \neq f_Q$), which are lower than the spectrum components of modulation electric signals for driving the I/Q channels, on the optical modulation signal spectrum components of the I/Q channels. As means to achieve this, modulation data may be preliminarily subjected to digital processing for processing (preceding) the modulation data so that the optical modulation spectrum components of the frequencies $f_I$ and $f_Q$ appear. Alternatively, at least one of the plurality of waveguide-type optical phase modulator regions 14 or the optical phase modulator region 14 for phase difference adjustment between two paths of the MZ interferometer may be directly driven by electric signals having the frequencies $f_I$ and $f_Q$.

In this configuration, the modulated optical signal outputs of the digital division multilevel optical modulators for the I-channel and the Q-channel can be independently extracted (Monitor I and Monitor Q shown in FIG. 9). In this configuration, the modulation voltage amplitudes of the I-channel and the Q-channel and the bias voltage are optimally controlled so that the amplitudes of the low-frequency-superimposed components of the frequencies $f_I$ and $f_Q$ included therein become maximum. This enables the digital division multilevel optical modulators for the I-channel and the Q-channel to perform an ideal push-pull operation.

When the optical modulation signal components of the frequencies $f_I$ and $f_Q$ ($f_I \neq f_Q$) are preliminarily superimposed in this manner, four frequency components including the frequencies $f_I$ and $f_Q$ as well as the sum frequency component of $f_I + f_Q$ and the difference frequency component of $f_I - f_Q$ appear in the modulated optical signal spectrum obtained after multiplexing the I/Q channels with a certain phase relation. When the phase relation is optimally controlled in the case of multiplexing the I/Q channels so as to maintain the ideal orthogonal state between the I-channel and the Q-channel, the sum frequency component of $f_I - f_Q$ and the difference frequency component of $f_I - f_Q$ completely disappear. Accordingly, in order to maintain the ideal orthogonality between the I-channel and the Q-channel, at least one of the spectrum components of the sum frequency component of $f_I + f_Q$ and the difference frequency component of $f_I - f_Q$ may be monitored, and electric signals to be applied to the control electrode $V_{90}$ may be controlled to minimize the spectrum components to be fed back to the phase shift amount of the optical phase shift means 18. The principle itself can also be applied to means for monitoring and controlling the orthogonal state between polarized light beams in the systems (optical polarization coupling, polarized light coupling) in which two different modulated optical signals of linearly polarized light having the same wavelength are made orthogonal to each other and multiplexed as well as in the optical quadrature modulation system (optical I/Q modulation system).

Eighth Example

An eighth example is azo example of operation verification of the digital segmented electrode structure programmable multilevel optical modulator module 700 according to the seventh exemplary embodiment using two-channel digital segmented electrode structure semiconductor multilevel optical modulators (for the I-channel and the Q-channel), an optical phase shifter, an optical quadrature modulator including an optical multiplexer/demultiplexer, and a CMOS-IC. In the eighth example, modulation data of 32 Gb/s to be supplied to each of the I-channel and the Q-channel was subjected to precoding to superimpose modulation components of 2 kHz and 3 kHz by digital signal processing. The modulated optical signals of the I-channel and the Q-channel are combined using the two-input/two-output optical multiplexer through the optical phase shifter for providing a phase difference of 90 degrees. One of the two modulated light output signals output therefrom is output to the outside of the module through an optical fiber (not shown). The other modulated light output signal is output to photo-detecting means (not shown) to monitor the light intensity of the modulated optical signal and the orthogonal state between the I/Q channels. This photo-detecting means includes a bandpass filter that converts an optical signal into an electric signal and extracts a component corresponds to beat frequency (1 kHz) of the low-frequency-superimposed components of 2 kHz and 3 kHz. This bandpass filter can be formed of an analog electric circuit, or can be a digital filter. A voltage applied to the optical phase shifter was controlled to minimize this difference frequency component. As a result, an ideal orthogonal state having a phase difference between the I/Q channels within 90±0.1 degrees, which is small enough to practically neglect the interference between the both channels, was able to be maintained. Also in the case of monitoring the sum frequency of 5 kHz contained in the modulated optical signal components, it is obvious that basically the same control can be achieved. Further, in the case of performing dual polarization quadrature coupling using two digital segmented electrode structure multilevel optical modulator modules, for example, the frequencies of the low-frequency components to be superimposed on the I-channel and the Q-channel of the second digital segmented electrode structure multilevel optical modulator module (for the cross-polarization) may be respectively set to 6 kHz and 10 kHz, for example. As a result, the difference frequency of 4 kHz and the sum frequency of 16 kHz are obtained, so that all the low-frequency components of the first and second modules do not superimposed one on another. This facilitates monitoring of the I/Q orthogonal state of each of the first and second modules.

Other Exemplary Embodiment

Note that the present invention is not limited to the above exemplary embodiments, but can be modified as needed without departing from the scope of the invention. For example, the number of waveguide-type optical phase modulators to be installed is not limited to that of the above exemplary embodiments and examples. An arbitrary number of waveguide-type optical phase modulators may be used.

For example, each of the driving signal lines 3 may be directly mounted on an IC using a gold (Au) bump, instead of using a strip line. The circuit blocks such as the individual driving circuits and the arithmetic circuit may be monolithically integrated on the same semiconductor substrate.

In the present invention, the voltage amplitude for driving each waveguide-type optical phase modulator region can be suppressed to a low level by increasing the number of the segmented regions. Accordingly, a terminator may be formed on the same semiconductor substrate together with the individual driving circuits. Further, the present invention may be produced using a silicon (Si) optical waveguide as a base, instead of using a compound semiconductor. Furthermore, in this case, driving circuits and optical modulators may be monolithically integrated on the same semiconductor substrate. Similarly, the present invention is also applicable to waveguide-type multilevel optical modulators produced using an electro-optic crystal, an organic compound, or the like having Pockels effect or a higher electro-optical effect, as typified by LN described above, as a substrate. This is advantageous when a change in refractive index with respect to an applied voltage amplitude is larger than that in the above-mentioned semiconductor.

Furthermore, the digital segmented electrode structure programmable multilevel optical modulator module 300 shown in FIG. 4 has the configuration in which the terminal receiving the offset signal Offset is extracted to the outside. Alternatively, a configuration may be employed in which the arithmetic circuit 5 applies an optimum voltage through a D/A converter.

Moreover, the pair of optical multiplexers/demultiplexers 15 in the digital segmented electrode structure programmable multilevel optical modulator module 301 according to the fourth example may be replaced with a five-input/five-output multiplexer/demultiplexer with which the effect of further suppressing internal residual reflections is expected. In this case, however, central two terminals of each of the five input/output terminals need to be terminated without reflection.

In the fourth exemplary embodiment, the lengths of the waveguide-type optical phase modulator regions are increased by a power-of-two multiple in order from the input side. However, the waveguide-type optical phase modulator regions may be arranged in any order, as long as the waveguide-type optical phase modulator regions have different lengths and the lengths are a power-of-two multiple of a certain unit length.

While the present invention has been described with reference to exemplary embodiments, the present invention is not limited to the above-described exemplary embodiments. The configuration and details of the present invention can be modified in various manners which can be understood by those skilled in the art within the scope of the invention.

This application is based upon and claims the benefit of priority from Japanese patent application No. 2009-235014, filed on Oct. 9, 2009, the disclosure of which is incorporated herein in its entirety by reference.

INDUSTRIAL APPLICABILITY

An optical modulator module and a method for modulating an optical signal according to exemplary aspects of the present invention are applicable to an optical transmitter for a wavelength-division multiplexing optical fiber communication system.

REFERENCE SIGNS LIST 1, 6, 6b, 7 DIGITAL SEGMENTED ELECTRODE STRUCTURE OPTICAL MODULATOR
2a-2f INTEGRATED CIRCUIT
3 DRIVING SIGNAL LINE
4 POTENTIAL CLAMP MEANS
5 ARITHMETIC CIRCUIT
11, 11a SEMICONDUCTOR OPTICAL WAVEGUIDE
12, 15, 17 OPTICAL MULTIPLEXER/DEMULTIPLEXER
13, 16 DIGITAL SEGMENTED ELECTRODE STRUCTURE OPTICAL PHASE MODULATOR
14 WAVEGUIDE TYPE OPTICAL PHASE MODULATOR REGION
18 OPTICAL PHASE SHIFT MEANS
21 INDIVIDUAL DRIVING CIRCUIT
22, 26 TERMINATOR
23 BRANCH
24 DRIVING CIRCUIT
25 PHASE SHIFT CIRCUIT
27 TRANSMISSION LINE
28 ADDER
29 BUFFER
100, 101, 400 DIGITAL SEGMENTED ELECTRODE STRUCTURE MULTILEVEL OPTICAL MODULATOR MODULE
200, 300, 301, 400, 500, 600, 700 DIGITAL SEGMENTED ELECTRODE STRUCTURE PROGRAMMABLE MULTILEVEL OPTICAL MODULATOR MODULE
$A_i$ WAVEGUIDE TYPE OPTICAL PHASE MODULATOR REGION CLLR CLOCK SIGNAL
$FF_1$-$FF_m$ MICRO DRIVING CIRCUIT
$I_1$-$I_m$ CURRENT SOURCE
$Q_{a1}$-$Q_{am}$, $Q_{b1}$-$Q_{bm}$ TRANSISTOR
$R_1$-$R_4$ RESISTOR

The invention claimed is:

1. An optical modulator module comprising:
    an optical modulator that modulates an input optical signal; and
    m ($2 \leq m$, m is an integer) individual driving circuits connected in cascade,
    wherein the optical modulator comprises:
        an optical waveguide that guides the optical signal; and
        at least m waveguide-type optical phase modulator regions arranged on the optical waveguide,
    wherein an i ($1 \leq i \leq m$, i is an integer)-th individual driving circuit comprises:
        a driving circuit that outputs a signal obtained by amplifying a digital input signal in synchronization with a clock signal to an i-th waveguide-type optical phase modulator region; and
        a phase shift circuit that applies a delay to at least a signal branched from the clock signal and outputs the signal, and
    wherein a j ($2 \leq j \leq m$, j is an integer)-th individual driving circuit receives a signal output from the phase shift circuit of a (j−1)-th individual driving circuit as the clock signal.

2. The optical modulator module according to claim 1, wherein the phase shift circuit further performs amplitude adjustment and waveform shaping on the signal branched from the clock signal.

3. The optical modulator module according to claim 1, wherein the m individual driving circuits are monolithically integrated on a semiconductor substrate.

4. The optical modulator module according to claim 1, further comprising:
    m driving signal lines respectively connecting the waveguide-type optical phase modulator regions with the individual driving circuits; and
    m first terminators connected between a ground potential and each of the m driving signal lines.

5. The optical modulator module according to claim 4, wherein the m individual driving circuits and the m first terminators are monolithically integrated on a semiconductor substrate.

6. The optical modulator module according to claim 4, wherein the optical modulator and the m first terminators are monolithically integrated on a semiconductor substrate.

7. The optical modulator module according to claim 1, further comprising a second terminator connected between an output of the phase shift circuit of an m-th individual driving circuit and a ground potential.

8. The optical modulator module according to claim 1, wherein the waveguide-type optical phase modulator regions have the same length.

9. The optical modulator module according to claim 1, wherein
$2^k$ (1≤k≤m, k is an integer) digital input signals are generated by duplicating a single digital signal, and
signals obtained by amplifying the $2^k$ digital input signals are respectively input to $2^k$ waveguide-type optical phase modulator regions.

10. The optical modulator module according to claim 1, wherein the length of an i-th waveguide-type optical phase modulator region is $2^i$ times as long as a certain unit length.

11. The optical modulator module according to claim 1, wherein the waveguide-type optical phase modulator regions have different lengths which are a power-of-two multiple of a certain unit length.

12. The optical modulator module according to claim 1, wherein driving voltages having the same amplitude are respectively applied to the waveguide-type optical phase modulator regions.

13. The optical modulator module according to claim 1, wherein the phase shift circuit applies a delay to a signal branched from the clock signal, the delay being controlled by an externally input electric signal.

14. The optical modulator module according to claim 1, wherein a delay of the phase shift circuit in an i-th individual driving circuit is substantially equal to a difference in time required for optical signal to travel a distance between middle points of a (i−1)-th waveguide-type optical phase modulator region and an i-th waveguide-type optical phase modulator region.

15. The optical modulator module according to claim 1, wherein the waveguide-type optical phase modulator regions are obtained by applying Franz=Keldysh effect or quantum confined Stark effect in a semiconductor, or Pockels effect in an electro-optic crystal.

16. The optical modulator module according to claim 1, wherein the waveguide-type optical phase modulator regions are respectively provided on g optical waveguides optically connecting an f-input/g-output (f and g are integers equal to or greater than 2) optical demultiplexer and a g-input/f-output optical multiplexer.

17. The optical modulator module according to claim 16, further comprising a potential clamp unit that is connected to a coupling unit for optically coupling the f-input/g-output optical demultiplexer and the g-input/f-output optical demultiplexer with the waveguide-type optical phase modulator regions neighboring the f-input/g-output optical demultiplexer and the g-input/f-output optical demultiplexer.

18. The optical modulator module according to claim 16, wherein
the f-input/g-output optical demultiplexer is a two-input/two-output optical demultiplexer,
the g-input/f-output optical multiplexer is a two-input/two-output first optical multiplexer, and
two optical waveguides connecting the two-input/two-output optical demultiplexer with the first optical multiplexer and connecting the two-input/two-output optical demultiplexer with the first optical multiplexer form a Mach-Zehnder type interferometer.

19. The optical modulator module according to claim 18, further comprising:
two Mach-Zehnder type interferometers including a first Mach-Zehnder type interferometer and a second Mach-Zehnder type interferometer, the first and second Mach-Zehnder type interferometers being arranged in parallel; and
a two-input/two-output second optical multiplexer having an input optically connected to a Q-channel output of the first Mach-Zehnder type interferometer, and having another input optically connected to an I-channel output of the second Mach-Zehnder type interferometer, wherein
the potential clamp unit is disposed between one of the Q-channel output of the first Mach-Zehnder type interferometer or the I-channel output of the second Mach-Zehnder type interferometer and an input of the second optical multiplexer.

20. The optical modulator module according to claim 19, further comprising:
a first superimposing unit that superimposes a frequency component fl lower than that of a first optical signal on the first optical signal output from the Q-channel output of the first Mach-Zehnder type interferometer;
a second superimposing unit that superimposes a frequency component $f_Q$ lower than that of a second optical signal on the second optical signal output from the I-channel output of the second Mach-Zehnder type interferometer;
a extracting unit that extracts low frequency modulation components of frequencies $f_I$, $f_Q$, $f_I+f_Q$, and $f_I-f_Q$ from an output optical signal from the second optical multiplexer; and
a controlling unit that controls a phase difference between the first optical signal and the second optical signal to minimize the low frequency modulation component of one of the frequencies $f_I+f_Q$ and $f_I-f_Q$ extracted.

21. The optical modulator module according to claim 18, further comprising:
two Mach-Zehnder type interferometers including a first Mach-Zehnder type interferometer and a second Mach-Zehnder type interferometer, the first and second Mach-Zehnder type interferometers being arranged in parallel;
a two-input/two-output second optical multiplexer having an input optically connected to a Q-channel output of the first Mach-Zehnder type interferometer, and having another input optically connected to an I-channel output of the second Mach-Zehnder type interferometer; and
potential clamp means disposed between one of the Q-channel output of the first Mach-Zehnder type interferometer or the I-channel output of the second Mach-Zehnder type interferometer and an input of the second optical multiplexer.

22. The optical modulator module according to claim 21, further comprising:
means for superimposing a frequency component $f_I$ lower than that of a first optical signal on the first optical signal output from the Q-channel output of the first Mach-Zehnder type interferometer;
means for superimposing a frequency component $f_Q$ lower than that of a second optical signal on the second optical signal output from the I-channel output of the second Mach-Zehnder type interferometer;
means for extracting low frequency modulation components of frequencies $f_I$, $f_Q$, $f_I+f_Q$, and $f_I-f_Q$ from an output optical signal from the second optical multiplexer; and
means for controlling a phase difference between the first optical signal and the second optical signal to minimize the low frequency modulation component of one of the frequencies $f_I+f_Q$ and $f_I-f_Q$ extracted.

23. The optical modulator module according to claim 16, further comprising potential fixing means connected to coupling means for optically coupling the f-input/g-output optical demultiplexer and the g-input/f-output optical demultiplexer with the waveguide-type optical phase modulator regions neighboring the f-input/g-output optical demultiplexer and the g-input/f-output optical demultiplexer.

24. The optical modulator module according to claim 1, further comprising an input clock signal variation allowing unit that allows an input clock signal to be varied.

25. The optical modulator module according to claim 1, wherein each of the individual driving circuits comprises a multi-leveled voltage outputting unit that allows an amplitude of an output voltage of each of the individual driving circuits to be multileveled.

26. The optical modulator module according to claim 1, wherein the phase shift circuit comprises a transmission line.

27. The optical modulator module according to claim 1, further comprising an arithmetic circuit that generates m time-series digital input signals from p (2≤p, p is an integer) time-series digital input signals according to a set operation parameter, wherein one of the m time-series digital input signals is input to each of the n individual driving circuits.

28. The optical modulator module according to claim 1, wherein the optical modulator module has a function of dynamically rewriting the operation parameter by external signal.

29. The optical modulator module according to claim 1, further comprising means for allowing an input clock signal to be varied.

30. The optical modulator module according to claim 1, wherein each of the individual driving circuits comprises means for allowing an amplitude of an output voltage of each of the individual driving circuits to be multileveled.

31. A method for modulating an optical signal comprising:

generating, by an i (1≤i≤m, i is an integer)-th individual driving circuit among m (2≤m, m is an integer) individual driving circuits connected in cascade, a signal obtained by amplifying a digital input signal in synchronization with a clock signal;

outputting, by a driving circuit, the amplified signal to an i-th waveguide-type optical phase modulator region among m waveguide-type optical phase modulator regions formed on an optical waveguide of an optical modulator;

outputting, by a phase shift circuit, a signal obtained by applying a delay to at least a signal branched from the clock signal; and inputting, to a j (2≤j≤m, j is an integer)-th individual driving circuit, a signal output from the phase shift circuit of a (j−1)-th individual driving circuit as the clock signal.

* * * * *

UNITED STATES PATENT AND TRADEMARK OFFICE
CERTIFICATE OF CORRECTION

PATENT NO.         : 8,744,219 B2                                   Page 1 of 1
APPLICATION NO.    : 13/436145
DATED              : June 3, 2014
INVENTOR(S)        : Tomoaki Kato It is certified that error appears in the above-identified patent and that said Letters Patent is hereby corrected as shown below:

In the Specification

Column 9, Line 34: Delete "output" and insert -- output. --

Column 9, Line 62: Delete "a n d" and insert -- and --

Column 14, Line 19: Delete "1550 mil" and insert -- 1550 nm --

Column 17, Line 30: Delete "au" and insert -- an --

Column 22, Line 51: Delete "example;" and insert -- example, --

Column 23, Line 39: Delete "(in" and insert -- (m --

Column 27, Line 60: Delete "azo" and insert -- an --

In the Claims

Column 32, Line 13: In Claim 20, delete "fl" and insert -- $f_I$ --

Signed and Sealed this
Twenty-first Day of October, 2014

Michelle K. Lee
*Deputy Director of the United States Patent and Trademark Office*